(12) United States Patent
White et al.

(10) Patent No.: US 12,034,832 B1
(45) Date of Patent: Jul. 9, 2024

(54) SYSTEMS AND METHODS FOR DATA ENCRYPTION, DECRYPTION, AND AUTHENTICATION

(71) Applicant: ATOFIA LLC, Nashville, TN (US)

(72) Inventors: Thurman Richard White, Nashville, TN (US); Martin Thomas Poe, III, Nashville, TN (US); Martin Thomas Poe, IV, Mount Juliet, TN (US)

(73) Assignee: ATOFIA LLC, Nashville, TN (US)

( * ) Notice: Subject to any disclaimer, the term of this patent is extended or adjusted under 35 U.S.C. 154(b) by 0 days.

(21) Appl. No.: 18/200,211

(22) Filed: May 22, 2023

(51) Int. Cl.
*H04L 9/06* (2006.01)
*H04L 9/08* (2006.01)

(52) U.S. Cl.
CPC .......... *H04L 9/0631* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 8,396,221 B2* | 3/2013 | Sudhakar | ................ | H04L 9/083 380/278 |
| 11,176,624 B2* | 11/2021 | Chu | ........................ | G06Q 50/06 |
| 2009/0217043 A1* | 8/2009 | Metke | ................. | H04W 12/069 713/171 |
| 2019/0052468 A1* | 2/2019 | Ngoc-Ai Lu | ........... | H04L 9/008 |

* cited by examiner

*Primary Examiner* — Bassam A Noaman
(74) *Attorney, Agent, or Firm* — Andre J. Bahou; Kristen H. Strickland; Bradley Arant Boult Cummings LLP

(57) ABSTRACT

A computer-implemented method for generating a trusted setup on a computing device. The method may include generating a unique single user profile (USUP) based on data derived from the computing device, generating a first binary matrix, executing a matrix mixing operation on the first binary matrix based on the USUP, executing the matrix mixing operation may generate a second binary matrix, generating trust anchor data, wherein the generating the trust anchor data may include selecting a first number and inputting the first number into a remainder generator, the remainder generator may be configured to select a second number, calculate a remainder, wherein the remainder is the remainder of the first number divided by the second number, and output a value pair that includes the second number and the remainder, wherein the trust anchor data is used for encrypting and decrypting data.

9 Claims, 16 Drawing Sheets

200

Generate a unique single user profile (USUP)
202

Generate a first binary matrix
204

Mix the first binary matrix based on the USUP to generate a second binary matrix
206

Generate trust anchor information
208

200

```
┌─────────────────────────────────────┐
│ Generate a unique single user profile│
│              (USUP)                  │
│               202                    │
└─────────────────────────────────────┘
                  │
                  ▼
┌─────────────────────────────────────┐
│    Generate a first binary matrix    │
│               204                    │
└─────────────────────────────────────┘
                  │
                  ▼
┌─────────────────────────────────────┐
│ Mix the first binary matrix based on │
│ the USUP to generate a second binary │
│                matrix                │
│                 206                  │
└─────────────────────────────────────┘
                  │
                  ▼
┌─────────────────────────────────────┐
│   Generate trust anchor information  │
│                 208                  │
└─────────────────────────────────────┘
```

```
┌─────────────────────────────────┐
│ Generate a unique single user   │
│ profile (USUP)                  │
│ 302                             │
└─────────────────────────────────┘
              │
              ▼
┌─────────────────────────────────┐
│ Encrypting the USUP             │
│ 304                             │
└─────────────────────────────────┘
              │
              ▼
┌─────────────────────────────────┐
│ Storing the encrypted USUP as   │
│ a binary fingerprint            │
│ 306                             │
└─────────────────────────────────┘
```

Group Policy
502

Entity Policy
504

Ciphertext Policy
506

Character Matrix P+1 Encryption Value Set
620(1)

Character Matrix P-1 Encryption Value Set
620(2)

Nibble Matrix P+1 Encryption Value Set
620(3)

Nibble Matrix P-1 Encryption Value Set
620(4)

Bit Matrix P+1 Encryption Value Set
620(5)

Bit Matrix P-1 Encryption Value Set
620(6)

FIG. 6B

1100 

```
┌─────────────────────────────────┐
│   Receive the ciphertext body   │
│              1102               │
└─────────────────────────────────┘
                │
                ▼
┌─────────────────────────────────┐
│  Retrieve the decryption value  │
│              sets               │
│              1104               │
└─────────────────────────────────┘
                │
                ▼
┌─────────────────────────────────┐
│ Execute one or more transforma- │
│   tions on the ciphertext body  │
│              1106               │
└─────────────────────────────────┘
```

FIG. 11

SYSTEMS AND METHODS FOR DATA ENCRYPTION, DECRYPTION, AND AUTHENTICATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

BACKGROUND OF THE DISCLOSURE

The present disclosure generally relates to computing technology, and more particularly to systems and methods for data encryption, decryption, and authentication.

Conventional cryptographic systems with a hierarchical structure include a trust anchor that is an authoritative entity for which trust is assumed and not derived. For example, in an architecture that implements the X.509 standard, the trust anchor is a root certificate from which the whole chain of trust is derived. The trust anchor must be in the possession of the trusting party beforehand to make any further certificate path validation possible. Conventional operating systems provide a built-in list of self-signed root certificates to function as trust anchors for applications. Web browsers and applications often provide their own list of trust anchors.

There are several disadvantages associated with such hierarchical cryptographic structures. First, the end-user of an operating system using such structures must implicitly trust in the correct operation of such software, and the software manufacturer, in turn, must delegate trust for certain cryptographic operations to the certificate authorities responsible for the root certificates. Such trust is not always reliable. Second, a malicious actor may modify some of the structure data, such as the list of certificates or the list of trust anchors, such that the malicious actor can decrypt encrypted data.

What is needed, then, are new systems and methods for data encryption, decryption, and authentication.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The systems and methods disclosed herein may not employ certificate authorities, certificate chains of trust, digital signatures, hashes, or asymmetric encryption in the design of trust anchor architecture. Instead, the systems and methods disclosed herein may include a new scheme and program for creating trust anchors based on context awareness, decision procedures or gateway proofs.

One aspect of the disclosure is a computer-implemented method for generating a trusted setup on a computing device. The method may include generating a unique single user profile (USUP) based on data derived from the computing device. The method may include generating a first binary matrix. The method may include executing a matrix mixing operation on the first binary matrix based on the USUP. Executing the matrix mixing operation may generate a second binary matrix. The method may include generating trust anchor data. Generating the trust anchor data may include selecting a first number and inputting the first number into a remainder generator. The remainder generator may be configured to select a second number, calculate a remainder, wherein the remainder is the remainder of the first number divided by the second number, and output a value pair that includes the second number and the remainder. Generating the trust anchor data may include converting the remainder to a first binary value, and storing the first binary value. At the conclusion of this trusted setup method, the computing device may be ready to encrypt data without using hierarchical cryptographic structures.

Another aspect of the disclosure includes a computer-implemented method for generating a ciphertext. The method may include generating a header for the ciphertext. The header may include data configuring one or more permissions for decrypting the ciphertext. The method may include generating instructions for the ciphertext. The instructions may include data used in the encryption of data. The method may include generating a ciphertext body. Generating the ciphertext body may include receiving the data to be encrypted. Generating the ciphertext body may include retrieving at least one encryption value set. The at least one encryption value set may include a mixing scheme, a bit value table, a first matrix size, a second matrix size, an encryption decider, and a decryption decider. Generating the ciphertext body may include generating at least one character matrix based on the data to be encrypted. Generating the ciphertext body may include executing at least one transformation operation on the at least one character matrix to generate the ciphertext body. The at least one transformation operation may be based on the at least one encryption value set. The method may include generating at least one decryption value set based on the at least one encryption value set. The method may include compiling the header, the instructions, and the ciphertext body into the ciphertext. As can be seen, the encryption of the plaintext message and the preparation of the ciphertext may not use hierarchical cryptographic structures.

Another aspect of the disclosure includes a computer-implemented method for decrypting a ciphertext. The method may include receiving a ciphertext. The ciphertext may include a header, instructions, and a ciphertext body. The method may include retrieving at least one decryption value set from the instructions. The at least one decryption value set may include a mixing scheme, a bit value table, a first matrix size, a second matrix size, and a decryption decider. the method may include generating at least one bit matrix based on the ciphertext body. The method may include executing at least one transformation operation on the at least one bit matrix to generate a plaintext decryption of the ciphertext body. The at least one transformation operation may be based on the at least one decryption value set. As can be seen, the decryption of the ciphertext body may not use hierarchical cryptographic structures.

The systems and methods disclosed herein include elements that improve the functioning of a computer and improve the technical field of cryptography. As discussed in the Background section above, in conventional hierarchical cryptographic structures, trust is assumed and not derived. One disadvantage of this is that the end-user using such structures must implicitly trust in the correct operation of the implementing software, and the software manufacturer, in turn, must delegate trust for certain cryptographic operations to the certificate authorities responsible for the root certificates. Such trust is not always reliable. Malicious actor may modify some of the structure data, such as the list of certificates or the list of trust anchors, such that the malicious actor can decrypt encrypted data. The systems and methods disclosed herein do not assuming such trust. Instead, users create their own trust anchors during the setup process, and the encryption of data uses data from these trust anchors to encrypt data. Furthermore, the encryption value sets, with their mixing schemes, a bit value tables, matrix sizes, encryption and decryption deciders, and the transformation operations that use them to encrypt data, provide for an unconventional way to encrypt data.

Additionally, another disadvantage of the conventional hierarchical cryptographic structures is that these structures often involve the generation of large prime numbers in order to create public and private keys. Determining whether a large number is prime uses a large amount of computing resources. The systems and methods disclosed here do not generate large prime numbers and, thus, do not use the large amounts of computing resources. Thus, the systems and methods disclosed herein provide for encryption and decryption of data that is both more secure than conventional hierarchical cryptographic structures and more efficient.

Numerous other objects, advantages and features of the present disclosure will be readily apparent to those of skill in the art upon a review of the following drawings and description of various embodiments.

BRIEF DESCRIPTION OF THE DRAWINGS

FIG. 2 is a flowchart illustrating one embodiment of a method for generating or setting up a trusted setup on the computing device.

FIG. 3 is a flowchart illustrating one embodiment of a method for generating identity- and trust-providing data.

FIG. 4 is a schematic block diagram illustrating one embodiment of a ciphertext in a system for data encryption or decryption.

FIG. 6B is a schematic block diagram illustrating one embodiment of a set of encryption value sets.

FIG. 10B is a is a schematic block diagram illustrating one embodiment of a set of decryption value sets and the corresponding encryption value sets they are derived from.

FIG. 11 is a flowchart diagram illustrating one embodiment of a method for decrypting the body of the ciphertext.

DETAILED DESCRIPTION

Figure 1A:
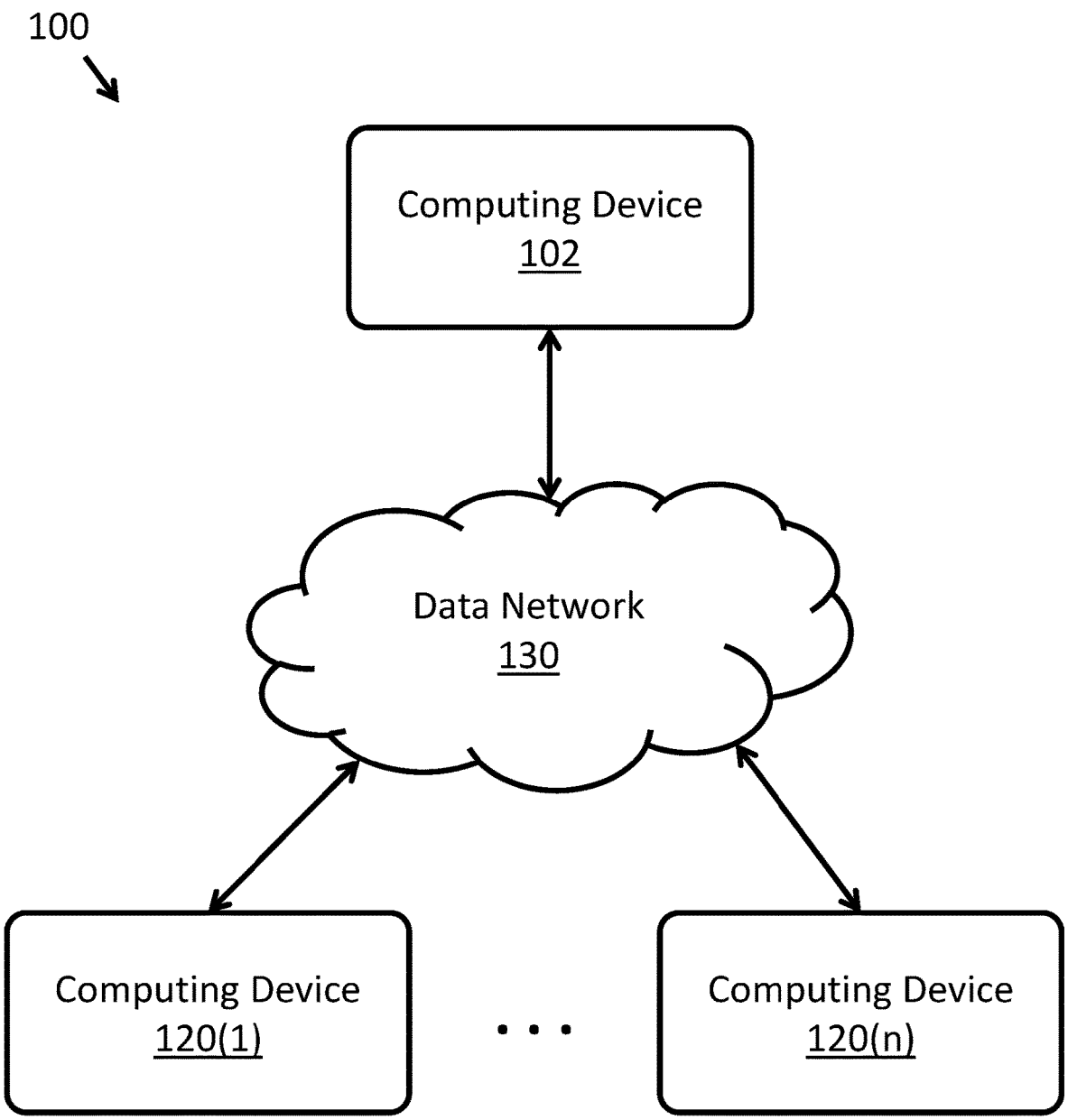
FIG. 1A is a schematic block diagram illustrating one embodiment of a system for data encryption or decryption.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n)" and "Second Elements (1)-(m)" where m is a number that may be the same or may be a different number than n.

Furthermore, through the disclosure, different matrices may be referred to as having the dimensions m or n. The letters m and n may represent numbers that may be different or may be the same. Also, while a first matrix and a second matrix may both have dimensions indicated by m or n, this does not necessarily mean that both matrices are the same size. The m of the first matrix may be a different value than the m of the second matrix, and the same may be true regarding the n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the term "computing platform" or "platform" may include a computing environment where a portion of software can execute. A computing platform may include hardware on which the software may execute. The computing platform may include an operating system. The computing platform may include one or more software applications, scripts, functions, or other software. The computing platform may include one or more application programming interfaces (APIs) by which different portions of the software of the platform may communicate with each other or invoke functions. The computing platform may include one or more APIs by which it may communicate with external software applications or by which external software applications may interact with the platform. The computing platform may include a software framework. The computing platform may include one or more VMs. The software platform may include one or more data storages. The software platform may include a client application that executes on an external computing device and that interacts with the platform in a client-server architecture.

As used herein, the term "data storage" may include a tangible device that retains and stores data. Such device may include an electronic storage device, a magnetic storage device, an optical storage device, an electromagnetic storage device, a semiconductor storage device, or any suitable combination of the foregoing. A non-exhaustive list of more specific examples of the devices may include a portable computer diskette, a random access memory (RAM), a read-only memory (ROM), an erasable programmable read-only memory (EPROM or flash memory), a static random access memory (SRAM), a hard disk drive (HDD), a solid state drive, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. "Data storage," in some embodiments, may include a data structure that stores data, and the data structure may be stored on a tangible data storage. Such data storage may include a file system, a database, cloud storage, a data warehouse, a data lake, or other data structures configured to store data.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "message" may include one or more formats for communicating (e.g., transmitting or receiving) information or data. A message may include a machine-readable collection of information such as an Extensible Markup Language (XML) document, fixed-field message, comma-separated message, or another format. A message may, in some implementations, include a signal utilized to transmit one or more representations of information or data.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions.

As used herein, the term "data object" may include a logical container for data. A data object may include an instance of an object in a software application implemented with an object-oriented programming language. A data object may include data formatted in an electronic data interchange (EDI) format, such as an extensible Markup Language (XML) object, a JavaScript Object Notation (JSON) object, or some other EDI-formatted object. A data object may include one or more functions that may manipulate the data of the data object. For example, a data object may include the functions or methods of an object in a software application implemented with an object-oriented programming language.

As used herein, the term "decentralized" means that at least a portion of information or functionality is not controlled by a single party. Instead, the decentralized information or functionality is distributed among several parties whose aggregate behavior affects the information or functionality. One example of a decentralized technology is a distributed ledger.

As used herein, the term "distributed ledger" may include a data storage of transactions replicated across and synchronized by multiple computers, called "nodes," in communication with each other. The nodes may synchronize the data of the distributed ledger, including which transactions are added to the ledger and in what order, using a consensus mechanism. The transactions may be cryptographically secured such that once a transaction is added to the distributed ledger, the transaction cannot be later modified. Basic encryption or cryptography principles-such a public key infrastructure, digital signatures, and other cryptographic technologies-underlie the application of distributed ledger technology. When a user adds a distributed ledger transaction, the user may digitally sign the transaction such that other parties can verify that the transaction did, in fact, originate from that user. One example implementation of a distributed ledger includes a blockchain.

As used herein, the term "blockchain" may include a list of blocks that are cryptographically linked together. Each block may include one or more blockchain transactions. Each block may include a cryptographic hash of the previous block in the blockchain. Each block may include a timestamp, which may include the timestamp of when the block was generated or when the block was added to the blockchain. The blockchain may be maintained as replicated and synchronized copies across a blockchain network of nodes. The nodes may generate blocks and may determine which transactions are included in which blocks and in what order, and the nodes may synchronize their blockchain copies via a consensus mechanism.

As used herein, a "token" may include a data asset represented by data on a blockchain. A token may be transferable between blockchain users via a transaction from a first user to a second user. As used herein, a "tokenized" asset may refer to an asset whose ownership interest is represented by one or more tokens. Thus, a user who owns a token may own at least a portion of the corresponding asset. A token representing a tokenized asset may directly represent ownership the asset or indirectly represent ownership of the asset. A token directly representing ownership may include the token itself representing ownership of the asset. A token indirectly representing ownership of the asset may include the token representing ownership of some other thing, which in turn may represent ownership of the asset. As an example of a token indirectly representing ownership of an asset, a token may represent ownership of at least part of a business entity such as a corporation, and the corporation may own a piece of real estate property. The token represents ownership of the piece of real estate property even though it is through ownership of the business entity.

As used herein, the term "transaction" may include a blockchain transaction. A blockchain transaction may include a source address, a destination address, an amount of cryptocurrency or a token, a timestamp indicating when the transaction was generated or other data. As used herein, a "cryptocurrency wallet" may include data that may allow a user of a blockchain network to send or receive cryptocurrency or tokens via the blockchain network. The cryptocurrency wallet may include one or more public keys, private keys, or other cryptographic components used to generate transactions. A cryptocurrency wallet may include a corresponding cryptocurrency wallet address that may uniquely identify the cryptocurrency wallet. As used herein, the terms a first user "sending" a second user cryptocurrency, or a token may include the first user generating a transaction where the destination address is the cryptocurrency wallet address of the second user. Hence, using a cryptocurrency wallet may not mean that cryptocurrency or a token is physically sent from, received at, or held in a cryptocurrency wallet, but, instead, transactions of the blockchain network indicate that the owner of the cryptocurrency wallet has ownership of certain cryptocurrency or tokens.

Overview

Figure 1B:
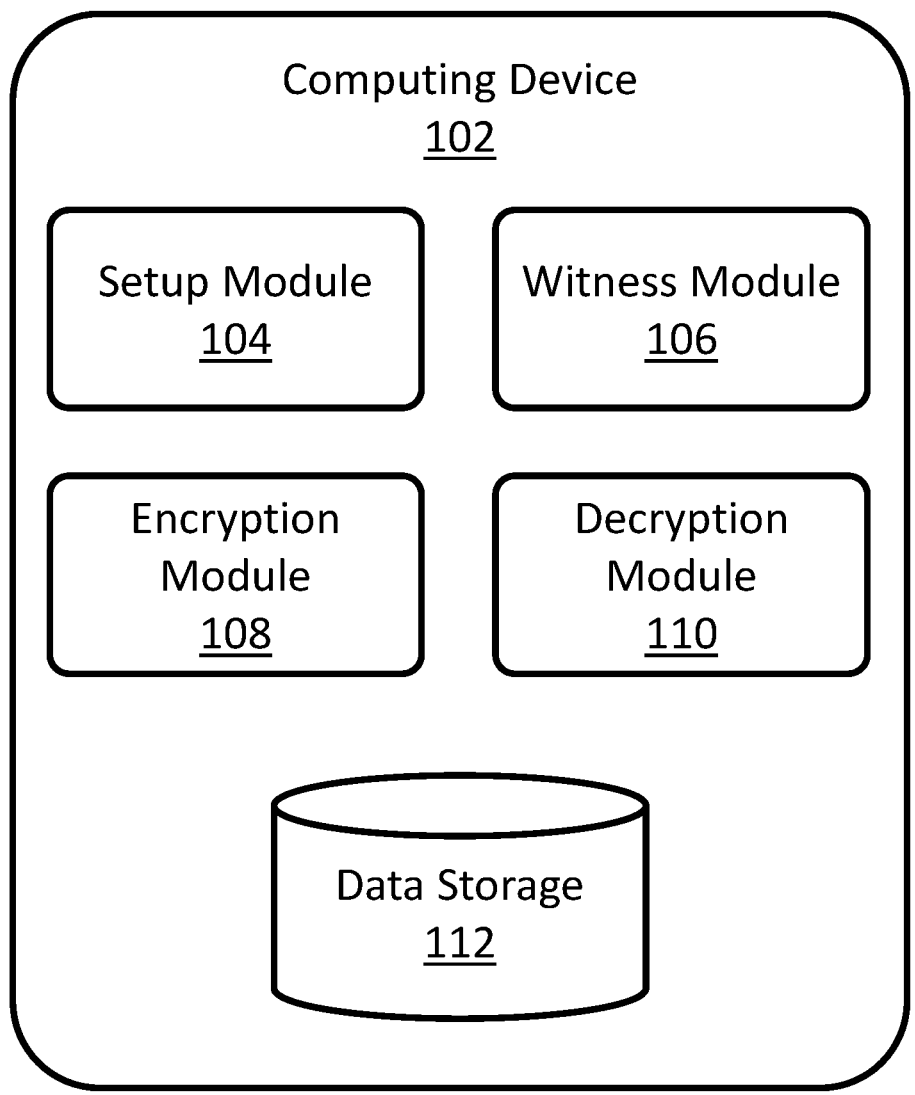
FIG. 1B is a schematic block diagram illustrating one embodiment of a computing device for use in a system for data encryption or decryption.

FIG. 1A depicts one embodiment of a system 100. The system 100 may include a system for data encryption or decryption. The system 100 may include a computing device 102. As can be seen in FIG. 1B, the computing device 102 may include a setup module 104, a witness module 106, an encryption module 108, or a decryption module 110. The computing device 102 may include a data storage 112. The system 100 may include other computing devices 120(1)-(n). These computing devices 120(1)-(n) may each include their own setup module 104, witness module 106, encryption module 108, decryption module 110, or data storage 112. The computing devices 102, 120(1)-(n) may be in data communication with each other over a data network 130.

In one embodiment, the setup module 104 may set up a logical environment on the computing device 102 for encrypting data and decrypting data. This setup process may include generating data used for encrypting or decrypting data and storing the generated data in the data storage. The encryption module 108 may encrypt data using the stored data. The decryption module 110 may decrypt data received from other computing devices 120(1)-(n).

In some embodiments, the system 100 may encrypt data without the use of certificate authorities, certificate chains of trust, digital signatures, hashes, or asymmetric encryption in the design of trust anchor architecture. Instead, the system 100 may utilize novel schemes and modules for creating trust anchors based on context awareness, decision procedures, or gateway proofs.

Generating the Trusted Setup

FIG. 2 depicts one embodiment of a method 200. The method 200 may include a computer-implemented method for generating or setting up a trusted setup on the computing device 102 of the system 100 of FIG. 1. The method 200 may include generating a unique single user profile (USUP) (step 202). The method 200 may include generating a first binary matrix (step 204). The method 200 may include mixing the first binary matrix based on the USUP to generate a second binary matrix (step 206). The method 200 may include generating trust anchor information (step 208). The system 100 may then be able to use the trust anchor information to generate one or more trust anchors in order to encrypt or decrypt data. In some embodiments, the setup module 104 may carry out one or more of the steps of the method 200.

In one embodiment, the method 200 may include generating the unique single user profile (USUP) (step 202). The setup module 104 may generate the USUP based on one or more pieces of data. The pieces of data may include data from the computing device 102. The data from the computing device 102 may include a username (e.g., a username of the user on the computing device 102), a device name (e.g., the device name of the computing device 102 or the system domain host name of the computing device 102), a user profile directory location (e.g., the user's user directory on the computing device's 102 file system), an executable file directory location (e.g., the directory location of the executable file of the setup module 104, the encryption module 108, or the decryption module 110), a device identifier (e.g., a media access control (MAC) address, a device ID, a product ID, a serial number of a hardware component of the computing device 102, an Internet Protocol (IP) address), or some other identification number associated with the computing device 102), or Basic Input/Output System (BIOS) data. The pieces of data may include biometric data (e.g., fingerprint data, face recognition data, iris or retina data, voice data associated with a user of the computing device 102), geolocation data, behavioral data, or other pieces of data.

In one embodiment the USUP may include one or more pieces of data concatenated together. For example, the USUP may include a text string that includes a concatenation of the username, the user profile directory, the device name, the device MAC address, and the executable file directory location with each piece of data separated by a delimiting character. Thus, the USUP may include the text string jsmith; C:\Users\jsmith; Desktop-JSmith; D8:12:65:C5: 75:91; C:\ProgramFiles\EncryptionProgram\encrypt. exe where "jsmith" is the username, "C:\Users\jsmith" is the user profile directory, "Desktop-JSmith" is the device name, "D8:12:65:C5:75:91" is the MAC address, and "C:\ProgramFiles\EncryptionProgram\encrypt.exe" is the executable file directory, and where ";" is the delimiting character.

The method 200 may include generating the first binary matrix (step 204). The first binary matrix may include an m by n matrix where each cell includes a binary string. In some embodiments, each of m and n may include natural numbers greater than 0. In some embodiments, m and n may be the same value or may be different values. In one embodiment, the first binary matrix may include a 16 by 16 matrix.

In one or more embodiments, each cell of the first binary matrix may include a binary string. The binary strings of different cells may be different lengths, or the binary strings of all the cells may be the same length. For example, each cell of the first binary matrix may include an 8 bit binary string. In one embodiment, the setup module 104 may use a pseudorandom number generator to generate each binary string in the first binary matrix.

In other embodiments, the setup module 104 may select two decimal numbers, add the two numbers together, convert the resulting sum to a binary number, and use this binary number as the value for the first cell. The setup module 104 may then generate the values of the remaining cells of the first binary matrix by increasing the value from the first cell by a predetermined amount for each remaining cell. The setup module 104 may proceed like this column by column until all cells have a value. As an example, for a first binary matrix of size 16 by 16, the setup module 104 may select the decimal numbers 65 and 66, add them together (131) and use the binary form of this number as the value of the first cell (cell [1][1]). The setup module 104 may increase this value by 1 (132) and use the binary form of 132 as the value for the next cell in the column (cell [2][1]), use the binary form of 133 as the value for the next cell in the column (cell [3][1]), and so on until cell [16][16] has the value of the binary form of 386. While in this example, the predetermined amount by which each cell value is increased is 1, the predetermined amount could be some other number, or could be a sequence of numbers (e.g., the Fibonacci sequence).

In one embodiment, the method 200 may include mixing the first binary matrix based on the USUP to generate the second binary matrix (step 206). In some embodiments, the step 206 may be called "executing a matrix mixing operation." Mixing the first binary matrix (step 206) may include calculating the length of the USUP. The length of the USUP may include the number of text characters in the USUP. The number of text characters may or may not include the delimiting character(s). The length of the USUP may be represented as in binary form. For example, the length of the USUP in the above example is 101, thus, the binary form of 101 is 1100101.

Mixing the first binary matrix (step 206) may include iterating across the binary form of the length of the USUP and transforming the first binary matrix based on whether the current digit is a 0 or a 1. Transforming the first binary matrix in response to the current digit being 1 may include executing the Transformation Engine P+1 (described below) on the first binary matrix. Transforming the first binary matrix in response to the current digit being 0 may include executing Transformation Engine P-1 on the first binary matrix. Each time a Transformation Engine (either P+1 or P-1) is executed on the first binary matrix, the first binary matrix may be modified by the Transformation Engine such that the subsequent Transformation Engine executes on the modified first binary matrix. After all of the Transformation Engine executions have occurred, the modified first binary matrix is designated as the second binary matrix.

In one embodiment, the Transformation Engine P+1, the Transformation Engine P-1, or a Transformation P-153 may include a module, subroutine, function, procedure, object-oriented software method, or other sequence of program instructions. Each Transformation Engine may accept a matrix as input. Each Transformation Engine may execute a different entropy function on the input matrix. The entropy functions may be based on mathematical explanations verses traditional mathematical algorithms. In some embodiments, a Transformation Engine may employ a transformation mixing function based on Claude Shannon's principles of diffusion and confusion.

In one embodiment, the Transformation Engine P+1 may operate according to the following steps: (1) receive a matrix as input; (2) execute permutations on the matrix by shuffling the cells of the matrix; (3) employ cycles on one or more subsets of the matrix, which may include, for each subset, iteratively shuffling the cells of the subset; (4) execute steps 2 through 3 one or more times until the following condition is satisfied: $2x-1=\log_2$ $y=z_1*(P+1)+w_1=w_1\mod(P+1)$ where: (a) the initial state of the matrix is $x=0$; (b) P=total number of discrete cells in the input matrix; (c) $w_1=y \mod(P+1)$; (d) $z_1=y/P+1$; and (e) x is the number of times steps 2 through 3 are executed such that $x>0\equiv1 \pmod{P+1}$; and (5) output x.

In one embodiment, the Transformation Engine P-1 may operate according to the following steps: (1) receive a matrix as input; (2) execute permutations on the matrix by shuffling the cells of the matrix; (3) employ cycles on one or more subsets of the matrix, which may include, for each subset, iteratively shuffling the cells of the subset; (4) execute steps 2 through 3 one or more times until the following condition is satisfied: $2x-1=\log_2$ $y=z_2*(P-1)+w_2\equiv w_2\mod(P-1)$ where: (a) the initial state of the matrix is $x=0$; (b) P=total number of discrete cells in the input matrix; (c) $w_2=y \mod(P-1)$; (d) $z_2=y/P-1$; and (e) x is the number of times steps 2 through 3 are executed such that $x>0\equiv1 \pmod{P-1}$; and (5) output x.

In one or more embodiments, the Transformation Engine P-153 may increase positional disorder and randomness of the individual cells within a matrix. The Transformation Engine P-153 may perform one or more string dislocation operations on the matrix, which may include shifting the contents of the cells of the matrix. In some embodiments, string dislocation may include moving the contents of the cells by a predetermined number, moving the contents forward or backward in the matrix (e.g., left-to-right, row-by-row; top-to-bottom, column-by-column; etc.). As an example, the Transformation P-153 may move the contents of the cells by two spaces going from left-to-right and row-by-row, and wrapping around to the beginning of the matrix if the end of the matrix is reached.

In one embodiment, the method 200 may include generating trust anchor information (step 208). Generating the trust anchor information (step 208) may include the setup module 104 using a remainder generator. A remainder generator may accept a first number as an input. The remainder generator may select a second number. The remainder generator may select the second number using pseudorandom number generation, accepting the second number as an input, or using some other method. The remainder generator may then calculate a third number where the third number is the remainder of the first number divided by the second number. In other words, the remainder generator may calculate: (the first number) mod (the second number)=(the third number). The output of the remainder generator may include one or more value pairs of a second number and a third number that satisfy (the first number) mod (the second number)=(the third number). In some embodiments, the remainder generator may be used by other modules of the computing device 102 and at other times.

In one embodiment, generating the trust anchor information (step 208) may include the setup module 104 selecting a first number. The first number may include a number greater than 0. The first number may include a whole number. The first number may include the length of the USUP, which may have been calculated as part of step 206. Generating the trust anchor information (step 208) may include the setup module 104 inputting the first number into a remainder generator in order to obtain three (second number, third number) pairs. Generating the trust anchor information (step 208) may include storing the remainders (the third numbers) produced as the outputs of the remainder generator. Generating the trust anchor information (step 208) may include including the second numbers in the setup module 104, the witness module 106, the encryption module 108, or the decryption module 110 for later use.

As an example, the first number may include 101 (the length of the USUP as calculated in step 206). Generating the trust anchor information (step 208) may include the setup module 104 inputting the number 101 (the first number) into the remainder generator. The remainder generator may randomly select 6, 27, and 3 as the second numbers. The remainder generator may calculate the remainders (the third numbers) of 101 divided by 6, 27, and 3, respectively, which may include calculating 101 mod 6=5, 101 mod 27=20, and 101 mod 3=2. The remainder generator may output the following value pairs: (6, 5), (27, 20), and (3, 2). The setup module 104 may store the remainders (in this case, 5, 20, and 2) for later use and may include the values 6, 27, and 3 in the setup module 104, the witness module 106, the encryption module 108, or the decryption module 110 for later use.

In one embodiment, after step 206, the method 200 may include generating one or more file directories. The file directories may be located on the computing device 102 (e.g., in the data storage 112) or on a data storage in data communication with the computing device 102. Each file directory may include one or more files. Each file may include trust anchor information and may be considered a trust anchor. In one embodiment, the setup module 104 may select a binary string from the second binary matrix to serve as a file directory name of the one or more file directories. In one embodiment, the setup module 104 may select a binary string from the second binary matrix to serve as a file name of the one or more files. In other embodiments, a file directory name or file name may include a predetermined text string, or a text string specified by the computing device 102 or a user of the computing device 102.

In one embodiment, the one or more file directories may include seven file directories. The first file directory may include two files. The first file may include decision procedures used to encrypt the USUP to create a real-time binary fingerprint. The second file may include decision procedures to decrypt a user's binary fingerprint (including a user of the computing device 102 or a third-party's binary fingerprint) and compare USUPs in real time.

The second file directory may include two files. The first file may include decision procedures to encrypt a group policy, and the second file may include decision procedures to encrypt document proper header information. The third file directory may include six files. Each of the six files may include a different matrix encryption value set. The fourth file directory may include one file: a file that includes decision procedures used to encrypt document proper file analysis.

The fifth file directory may include two files. The first file may include decision procedures to decrypt a group policy, and the second file may include decision procedures to decrypt document proper header information. The sixth file directory may include six files. Each of the six files may include a different matrix decryption value set. The seventh file directory may include a single file: a file that includes decision procedures used to decrypt document proper file analysis.

Creating a Proof of Identity

In one embodiment, the setup module 104 may generate data that provides identity and trust instead of acquiring such data from a third party (e.g., in the form of a digital certificate issued by a third party). FIG. 3 depicts one embodiment of a method 300 for generating such identity- and trust-providing data. The method 300 may include generating a unique single user profile (USUP) (step 302). The method 300 may include encrypting the USUP (step 304). The method 300 may include storing the encrypted USUP as a binary fingerprint (step 306).

In one embodiment, generating the USUP (step 302) may be similar to step 202 of the method 200 depicted in relation to FIG. 2, discussed above. In some embodiments, the setup module 104 may limit the number of characters in the USUP. For example, the USUP may include a maximum character limit of 140 characters. If the USUP's length is longer than the maximum character limit, the setup module 104 may truncate the USUP to the maximum character limit. In some embodiments, in response to the USUP having a character length of less than the maximum character limit, the computing device may pad the USUP until the USUP has a character length of the maximum character limit.

In one or more embodiments, encrypting the USUP (step 304) may include encrypting the USUP according to the method 900 of FIG. 9, discussed below. In such an embodiment, the data to be encrypted of step 902 may include the USUP, and the encryption value sets of step 904 may include at least a portion of the trust anchor information generated from the method 200 of FIG. 2, discussed above. The encrypted USUP may represent a binary fingerprint. In some embodiments, the binary fingerprint may have a character length longer than the character length of the USUP. For example, the binary fingerprint may be eight times longer. The binary fingerprint may be x times longer where x is a real number greater than 1. In some embodiments, the binary fingerprint may include binary data. The binary data may include a length of 1,120 binary digits.

In some embodiments, storing the binary fingerprint (step 306) may include storing the binary fingerprint in a binary file. The binary file may include a file of the one or more files of the one or more file directories discussed above in relation to FIG. 2. The binary file may include a randomly selected file.

In some embodiments, the computing device 102 may transmit the binary fingerprint over a data network to another computing device 120. The other computing device 120(1) may use the binary fingerprint, along with other data, to decrypt messages from the computing device or other data.

Ciphertext Architecture

Figure 4:
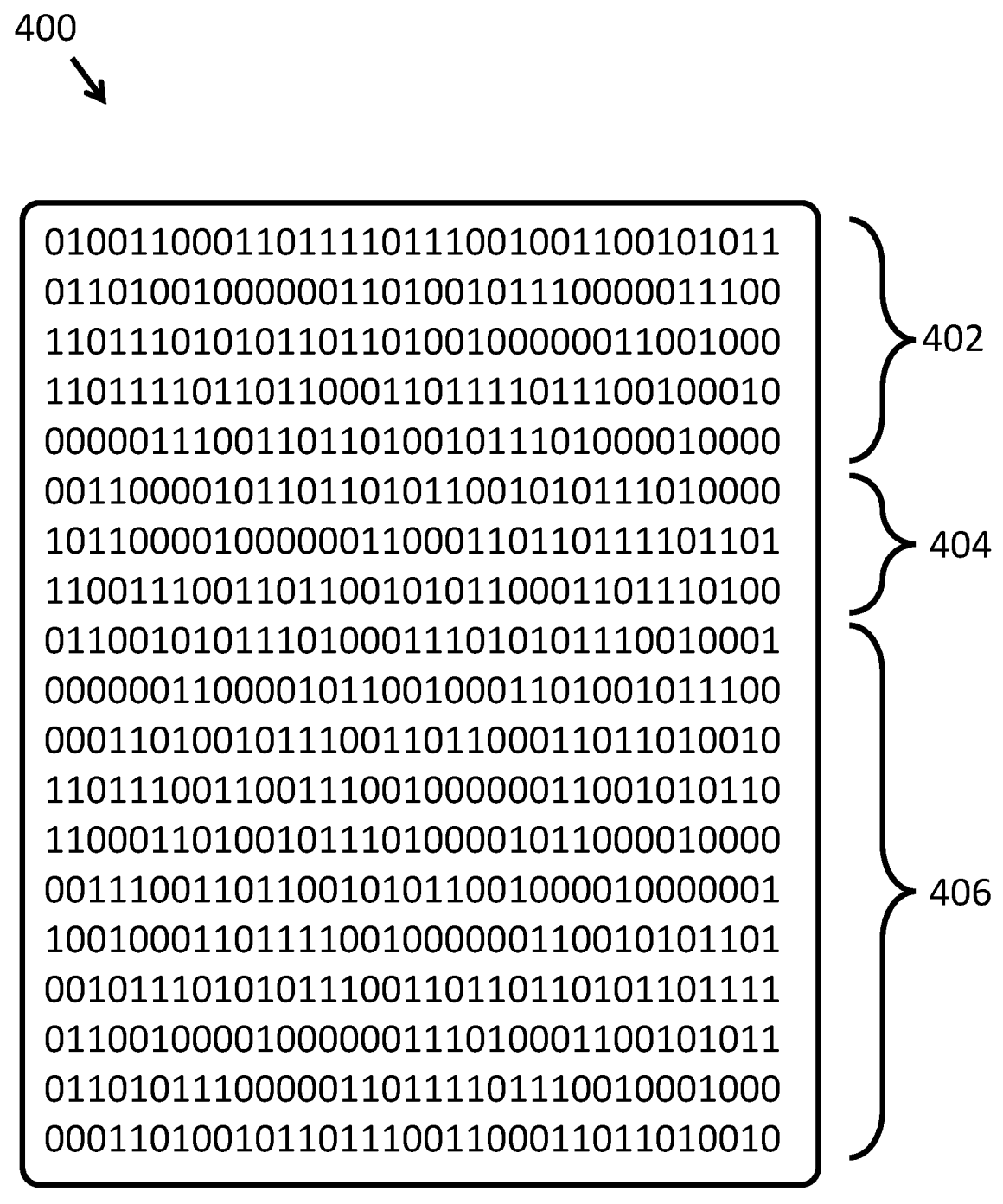

In one embodiment, the computing device's 102 encryption module 108 may encrypt data and send the encrypted data to another computing device 120. The decryption module 110 of the other computing device 120 may decrypt the received encrypted data. In one embodiment, the encrypted data may take the form a ciphertext. FIG. 4 depicts one embodiment of a ciphertext 400. The ciphertext 400 may include a blob of binary numbers. The ciphertext 400 may include a header 402. The ciphertext 400 may include instructions 404. The ciphertext 400 may include a body 406. As can be seen in FIG. 4, each of the header 402, instructions 404, and body 406 may include binary data.

Figure 5:
FIG. 5 is a schematic block diagram illustrating one embodiment of a ciphertext header.

FIG. 5 depicts one embodiment of the ciphertext's 400 header 402. In one embodiment, the header 402 may include data that describes, in a machine-readable manner, a decryption policy. The decryption policy may include one or more sets of permissions for the terms of decryption. The header 402 may include three policy classes: a group policy 502, an entity policy 504, and a ciphertext policy 506. Each policy 502, 504, 506 may be embedded with certain security or privacy conditions and may contribute to the overall access control conditions for the ciphertext 400 body 406. In one embodiment, the decryption module 110 of the computing device 120 may process the header 402 and may grant access to the body 406 in response to all conditions described in the policies 502, 504, 506 being met. If a condition of a policy 502, 504, 506 is not met, the decryption module 110 may halt and may deny access to the body 406.

In one embodiment, the group policy 502 may define the context associated with a group and the number of entities in the group authorized to decrypt the ciphertext 400 body 406. During the trusted setup process described above in relation to the method 200 of FIG. 2, the setup module 104 may establish the group policy 502 by an individual, group, or organization that operates the computing device 102. The setup module 104 may format the group policy 502 into a single, plaintext string. The software may calculate the length of the group policy 502 string and may present the length as a decimal value. The setup module 104 may use the length as the input to the remainder generator discussed above in relation to step 208 to calculate the three remainders and may convert each remainder to a binary value. Calculating the three remainders may include using the same second numbers as were selected during step 208 during the setup process. The setup module 104 may store the group policy 502 or the binary values in the first file of the second file directory.

In one embodiment, the entity policy 504 may include the binary fingerprint of each entity in the group. The entities in the group may include the sender of the message and the recipient(s) of the message. The computing device may generate the entity policy 504 during the method 200.

In some embodiments, the ciphertext policy 506 may include one or more unique identifiers. The one or more unique identifiers may include two identifiers. The encryption module 108 may append the one or more unique identifiers to the body 406. Although the one or more unique identifiers may be appended to the body 406, they still may be considered included in the ciphertext policy 506. The one or more identifiers may act as watermarks.

In one embodiment, during the execution of the setup process of the method 200, the setup module 104 may generate the first unique identifier. The first unique identifier may include a predetermined string of text. The setup module 104 may generate the first unique identifier based on input by the individual, group, or organization. The setup module 104 may calculate the length of the first unique identifier and use the length as the first number in the remainder generator discussed above in relations to step 208 of the method 200. The remainder calculator may calculate the three remainders, convert them to binary values, and append them to the body 506. Calculating the three remainders may include using the same second numbers as were selected during step 208 during the setup process. In one embodiment, the first unique identifier may authenticate, to the receiving entity(ies), the identity of the sender of the ciphertext 400.

In some embodiments, the second unique identifier may include the length of the body 406 as a number of blocks. To calculate the number of blocks, the encryption module 108 may convert the body 406 to binary format, retrieve the values m and n from the files called "Bit Matrix P+1" prepared by the witness module 106, generate a m by n matrix, and calculate (the length of the body 406 in bits) divided by (the size of the m by n matrix) rounded up the nearest whole number. For example, m may include 32 and n may include 128. Thus, the matrix may include a size of 4,096 (m multiplied by n). The length of the body in bits may include 164,300. Thus, 164,300 divided by 4,096 may equal 40.112 and may be rounded up to 41. Thus, 41 would be the length of the body 406 in as the number of blocks. The setup module 104 may use the number of blocks as the first number in the remainder generator discussed above in relation to step 208 of the method 200. The remainder generator may calculate the three remainders, convert them to binary values, and append them to the body 406. Calculating the three remainders may include using the same second numbers as were selected during step 208 during the setup process. In some embodiments, the second unique identifier may demonstrate, to the receiving entity(ies), the integrity of the body 406. In some embodiments, the setup module 104 may store the first or second unique identifiers or their respective remainders in the data storage 112.

In one embodiment, the instructions 404 of the ciphertext 400 may include data that the decryption module 110 may use to decrypt the ciphertext body 406. The details of such data are discussed below in relation to step 910 of the method 900 of FIG. 9. In one embodiment, as part of the decryption process, the decryption module 110 may recreate the file directory and file configuration that was created during the setup process of the method 200 of FIG. 2. The successful recreation of the configuration may verify the integrity of each directory and file location. It may also ensure that no deletions, edits, attacks, or movements of a file directory or file has occurred, since the last use of the modules 104-108. If the recreation of the file directories and files fails, the decryption module 110 may halt.

In one embodiment, the ciphertext 400 body 406 may include the encrypted message that was encrypted by the encryption module 108. The encryption of the message is discussed in detail below in relation to the method 900 of the FIG. 9.

Witness Module

In some embodiments, the computing device 102 may include a witness module 106. The witness module 106 may generate data employed by the encryption module 108 in the encryption method 700 of the FIG. 7, discussed below. The witness module 106 may create a trusted segregation of duties between the sending user and the recipient user. The witness module 106 may help ensure that each of the sender and the receiver expends a certain level of computational effort to complete a proof of work associated with the encryption/decryption processes. In some embodiments, the sender and the recipient may have no knowledge of the inner workings of the witness module 106. The witness module 106 may have no access to or knowledge of the plaintext version of the body 406 or ciphertext 400. The sender may not be able to encrypt plaintext without the encryption value sets from the witness module 106, and the recipient may not be able to decrypt the ciphertext 400 without the decryption value sets from the sender.

In one embodiment, the encryption module 108 may invoke the witness module 106 as part of the encryption method 700. In response, the witness module 106 may generate data to be used in the encryption method 700. The data may include one or more encryption values sets. In one embodiment, an encryption value set may include six values: a mixing scheme, a bit value table, a first matrix size (indicated by the letter m), a second matrix size (indicated by the letter n), an encryption decider, and a decryption decider.

In one embodiment, each value of an encryption value set may belong to one of two classes of values: pre-programmed or decimal. A pre-programmed value may include a binary value that has been pre-programmed into the witness module 106 (e.g., as volatile data included in the witness module 106 or in a configuration file of the witness module 106). A decimal value may include a value generated by the witness module 106 for the specific instance of running the encryption method 700. In one embodiment, the mixing scheme and the bit value table may be pre-programmed, and the values m, n, the encryption deciders, and the decryption deciders may be decimal. In some embodiments, the decimal values may be ephemeral and may change each time the encryption module 108 invokes the witness module 106. In some embodiments, the witness module 106 may generate the pre-programmed values during the setup process of the method 200 of FIG. 2.

Figure 6A:
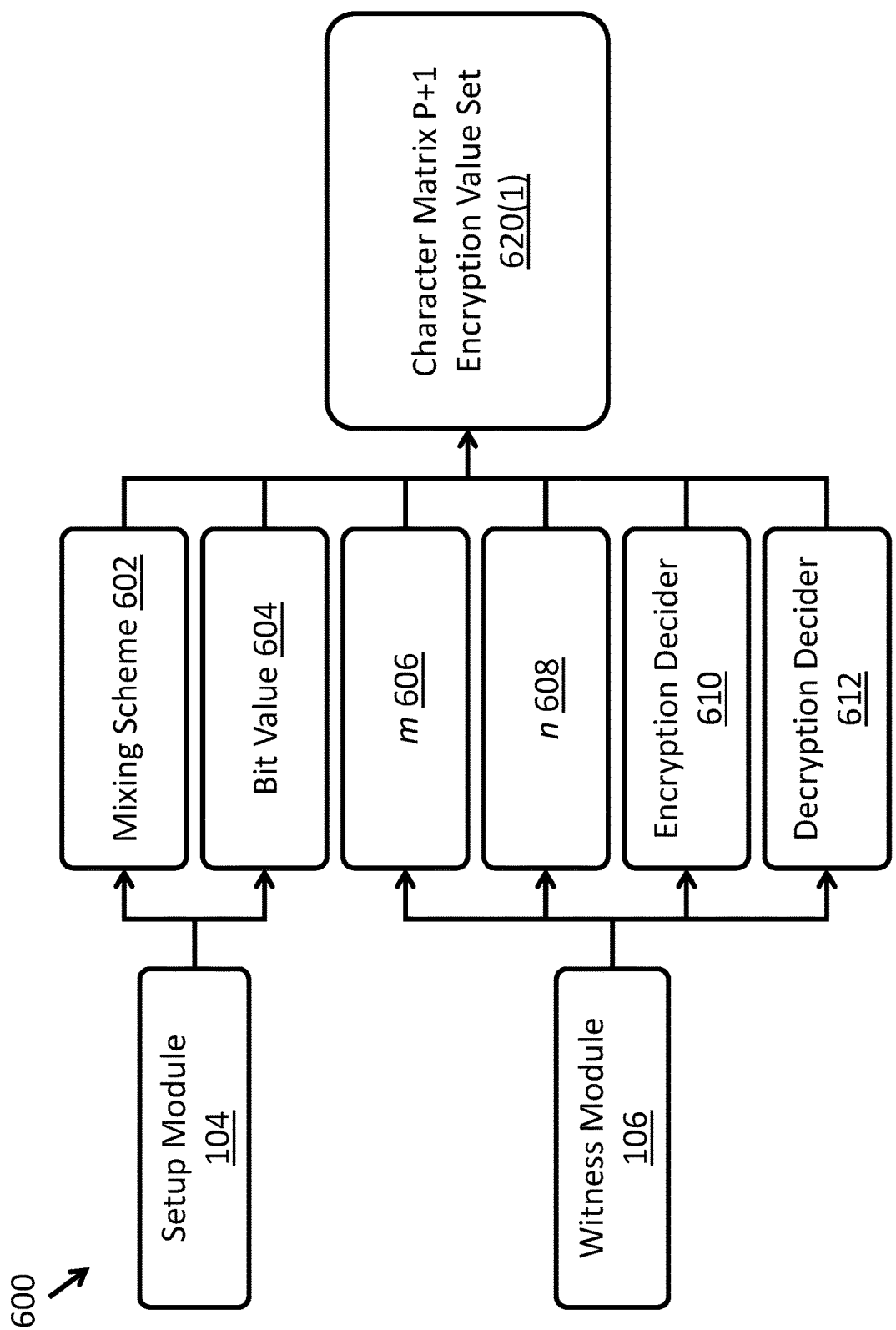
FIG. 6A is a data flow diagram illustrating one embodiment of the construction of an encryption value set for use in a system for data encryption or decryption.

FIG. 6A depicts one embodiment of a data flow 600. The data flow 600 may show how each value 602-612 of an encryption value set 620 (in the example of FIG. 6A, the "Character Matrix P+1" value set 620(1)) is included in the encryption value set 620. For example, the two pre-programmed values (i.e., the mixing scheme 602 and the bit value 604) may be provided by the setup module 104 or may be retrieved from the trusted environment set up by the setup module 104 in the method 200 of FIG. 2. The first matrix size 606, the second matrix size 608, the encryption decider 610, and the decryption decider 612 may be provided by the witness module 106 as discussed below. In some embodiments, the set of encryption value sets 620 may include fewer than six encryption value sets 620 or more than six encryption value sets 620. For example, there may be one encryption value set 620, two encryption value sets 620, three encryption value sets 620, four encryption value sets 620, five encryption value sets 620, seven encryption value sets 620, eight encryption value sets 620, nine encryption value sets 620, or ten encryption value sets 620.

In one embodiment, a mixing scheme 602 may include a sequence of executions of the one or more Transformation Engines discussed above (i.e., P+1, P−1, and P−153). The witness module 106 may randomly generate the sequence. The witness module 106 randomly generating the sequence may include the witness module 106 randomly selecting the length of the sequence (i.e., the number of Transformation Engine executions) or the contents of the sequence (i.e., for each slot in the sequence, whether the slot will include an execution of the Transformation Engine P+1, P−1, or P−153). However, in some embodiments, the sequence may include a length of three, and each type of Transformation Engine (P+1, P−1, and P−153) may be used only once. As discussed above, a Transformation Engine may accept a matrix as input, may transform the contents of that matrix, and output a new matrix. In the mixing scheme 602, the output matrix of a Transformation Engine may be used as the input matrix to the subsequent Transformation Engine until the sequence is complete. The witness module 106 may generate one or more mixing schemes 602 and may randomly select one of the mixing schemes 602 as the output.

As an example, the witness module 106 may randomly generate a mixing scheme 602 that includes the following sequence: P−153, P−1, P+1. Thus, the Transformation Engine P−153 may execute on the input matrix. The output of the Transformation Engine P−153 may be used as the input to the Transformation Engine P−1. The output of the Transformation Engine P−1 may be used as the input to the Transformation Engine P+1. The output of the Transformation Engine P+1 may be the output of the mixing scheme 602, and the mixing scheme 602 may halt.

In one embodiment, the witness module 106 may select a bit value 604. The bit value 604 may include a four-bit number. The bit value 604 may identify a bit value table. A bit value table may include a 4 by 4 matrix whose cells include the numbers 0 through 15 distributed throughout the matrix. The setup module 104 may generate one or more bit value tables during the setup process of the method 200 of FIG. 2. The bit value tables may be included in the encryption module 108 or decryption module 110. Each bit value table may be uniquely identified by a bit value 604. The witness module 106 selecting a bit value 604 may include the witness module 106 randomly selecting a four-bit number for inclusion in the encryption value set 620 as the bit value 604.

As an example, a bit value table may include the following matrix:

| | | | |
|---|---|---|---|
| 0111 | 0101 | 0010 | 1101 |
| 1111 | 1011 | 0100 | 0011 |
| 0001 | 1100 | 0000 | 1010 |
| 1000 | 0110 | 1001 | 1110 |

The bit value 604 that identifies this bit table may include "0111" (because, for example, the first cell of the bit table is "0111"). Other bit value tables may include the same values (i.e., the numbers 0000 through 1111) but in different locations in the bit table.

In one embodiment, one purpose of a bit table is to further obfuscate binary data. This may include converting a four-bit value into a different value based on the position in the bit table where that four-bit value is found. For example, using the table from the above example, in order to obfuscate the four-bit value 0101 (whose decimal value is 5), one would find the cell bit matrix[5] (i.e., the sixth cell of the table going from left-to-right, row-by-row) and use the value in that cell (in this example, "1011"). In order to un-obfuscate, the reverse process is used. For example, for the obfuscated value "1001," the position of that value is found in the bit table. In the example bit value table above, "1001" is in the cell bit matrix[14]), indicating that the un-obfuscated value is "1110" (whose decimal value is 14).

In some embodiments, the witness module 106 may generate one or more pairs of values (m, n) 606, 608 that will serve as the dimensions for one or more matrices. The witness module 106 may generate each value m, n 606, 608 using pseudorandom number generation. The witness module 106 may generate six pairs of m, n values 606, 608: (1) for use during encryption: (a) a character matrix, (b) a nibble matrix, and (c) a bit matrix; and (2) for use during decryption: (a) a bit matrix, (b) a nibble matrix, and (c) a character matrix. In some embodiments, the m and n values 606, 608 in a given value pair can be (even×even), (even×odd), or (odd×even). In some embodiments, the m and n values 606, 608 in a given pair may not be (odd×odd).

In some embodiments, the witness module 106 may generate one or more deciders. A decider may include an integer. A decider may include a number of times a permutation is executed. A decider may include an encryption decider 610 or a decryption decider 612. An encryption decider 610 may include the number of times a permutation must be executed to move a one-way function forward from the initiate state to an approximate midpoint in a mixing scheme 602. In one embodiment, the witness module 106 may generate six encryption deciders 610, one for each of: use of the Transformation Engine P+1 on the character matrix, use of the Transformation P−1 on the character matrix, use of the Transformation Engine P+1 on the nibble matrix, use of the Transformation Engine P−1 on the nibble matrix, use of the Transformation Engine P+1 on the bit matrix, and use of the Transformation Engine P−1 on the bit matrix.

Similarly, in some embodiments, a decryption decider 612 may include a number of times a permutation must be executed to move a one-way function forward from the approximate midpoint to a final state that is identical to the initial state in the mixing scheme 602. In one embodiment, the witness module 106 may generate six decryption deciders 612, one for each of: use of the Transformation Engine P+1 on the bit matrix, use of the Transformation P−1 on the bit matrix, use of the Transformation Engine P+1 on the nibble matrix, use of the Transformation Engine P−1 on the nibble matrix, use of the Transformation Engine P+1 on the character matrix, and use of the Transformation Engine P−1 on the character matrix.

As can be seen in FIG. 6B, in one embodiment, the witness module 106 may generate six different encryption value sets 620(1)-(6) for the encryption method 700. The six encryption value sets 620 may include Character Matrix P+1 620(1), Character Matrix P−1 620(2), Nibble Matrix P+1 620(3), Nibble Matrix P−1 620(4), Bit Matrix P+1 620(5), and Bit Matrix P−1 620(6).

In one embodiment, the witness module 106 may store the six encryption values sets 620 in the data storage 112. In one embodiment, each encryption value set 620 may be stored as a file, such as a text file. The witness module 106 may send the six text files to the encryption module 108 for use in the encryption method 700 of FIG. 7.

Encryption and Decryption

Figure 7:
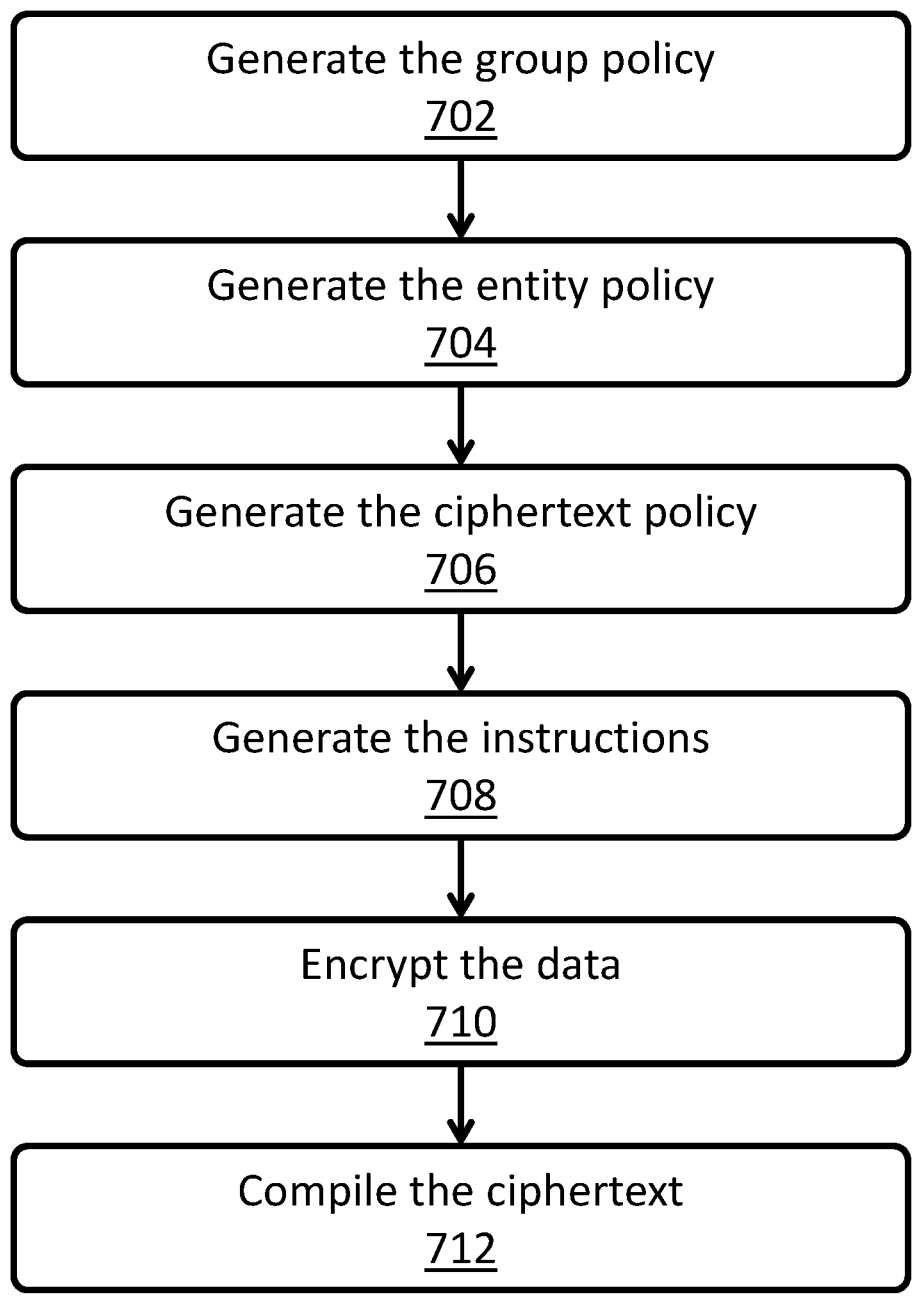
FIG. 7 is a flowchart diagram illustrating one embodiment of an encryption method for use in a system for data encryption or decryption.

FIG. 7 depicts one embodiment of a method 700. The method 700 may include an encryption method whereby the encryption module 108 may encrypt data to generate a ciphertext 400. The method 700 may include generating the group policy 502 (step 702). The method 700 may include generating the entity policy 504 (step 704). The method 700 may include generating the ciphertext policy 506 (step 706). The method 700 may include generating the instructions 404 (step 708). The method 700 may include encrypting the data (step 710). The method 700 may include compiling the ciphertext 400 from the results of steps 702-710 (step 712). In one embodiment, the encryption module 108 may perform one or more of the steps 702-712 of the method 700.

In one embodiment, generating the group policy 502 (step 702) may include the encryption module 108 retrieving the group policy 502 from the data storage 112 (e.g., from the first file of the second file directory). The group policy 502 may include a plaintext string. The encryption module 108 may retrieve the remainders stored with the group policy 502 or may calculate the remainders using the remainder generator discussed above in relation to step 208 of the method 200. The encryption module 108 may append the remainders to the group policy 502.

In one embodiment, generating the entity policy 504 (step 704) may include the encryption module 108 retrieving or generating the binary fingerprint of the user of the computing device 102. Generating the entity policy 504 (step 704) may include the encryption module requesting a copy of the binary fingerprint(s) from the user(s) of the other computing device(s) 120(1)-(n) who will receive the ciphertext 400. In some embodiments, generating the entity policy 504 (step 704) may include the encryption module 108 self-authenticating its own binary fingerprint. Generating the entity policy 504 (step 704) may include creating the entity policy 504 to include the user of the computing devices' 102 binary fingerprint and the binary fingerprint(s) of the recipient(s).

In one embodiment, the encryption module 108 self-authenticating may include the encryption module 108 (1) regenerating the user's USUP in the same manner as step 202 of the method 200; (2) retrieving the user's USUP generated during the step 202 of the method 200, which may be stored in the first file of the first file directory set up during the method 200; and (3) retrieving a copy of the user's binary fingerprint from another source and deriving the USUP from the binary fingerprint. The other source may include another user (e.g., a user of another computing device 120). The other user may have sent a copy of the first user's binary fingerprint in response to a request from the first user. The other user may have sent a copy of the first user's binary fingerprint in the entity policy 504 of the header 402 of a ciphertext 400. The other source may include some other third-party source (e.g., the third-party computing device 1302 of FIG. 13, discussed below). The encryption module 108 may determine whether all three USUPs match. In response to one of the USUPs not matching, the encryption module 108 may halt the encryption method 700. In some embodiments, in response to the USUPs not matching, the encryption module 108 may revoke the USUP stored in the first file of the first file directory.

In one embodiment, generating the ciphertext policy 506 (step 706) may include the encryption module 108 retrieving the first unique identifier discussed above in relation to the ciphertext policy 506 from the data storage 112. Generating the ciphertext policy 506 (step 706) may include the encryption module 108 generating the second unique identifier using the process discussed above in relation to the ciphertext policy 506. Certain portions of generating the ciphertext policy 506 (step 706) may occur after the encryption of the data (step 710) (e.g., generating the second unique identifier since the second unique identifier may be calculated from the encrypted body 406). In some embodiments, the encryption module 108 may also retrieve the respective remainders associated with the first or second unique identifiers. In some embodiments, the encryption module 108 may generate the first or second unique identifiers and then calculate their respective remainders using the remainder generator discussed above in relation to step 208 of the method 200.

In one embodiment, generating the instructions 404 (step 708) may include the encryption module 108 retrieving one or more files from the data storage 112 to generate the instructions 404. In some embodiments, certain portions of the step 708 may occur after the encryption of the data (step 710). For example, retrieving one or more files may include retrieving files that include the decryption values sets prepared during step 910 of the method 900 of FIG. 9, discussed below.

In one embodiment, encrypting the data (step 710) may include the encryption module 108 receiving the data to be encrypted and encrypting the data to generate the body 406. Details of the data encryption of the body 406 are discussed further below in relation to the method 900 of FIG. 9. In one embodiment, compiling the ciphertext 400 (step 712) may include the encryption module 108 generating the header 402 from the group policy 502, entity policy 504, and ciphertext policy 506 generated in steps 702-706 and including it as the header 402 of the ciphertext 400. Compiling the ciphertext 400 (step 712) may include the encryption module 108 including the instructions 404 generated in step 708 as the instructions 404 of the ciphertext 400. Compiling the ciphertext 400 (step 712) may include the encryption module 108 including the body 406 generated in step 710 as the body 406 of the ciphertext 400.

Figure 8:
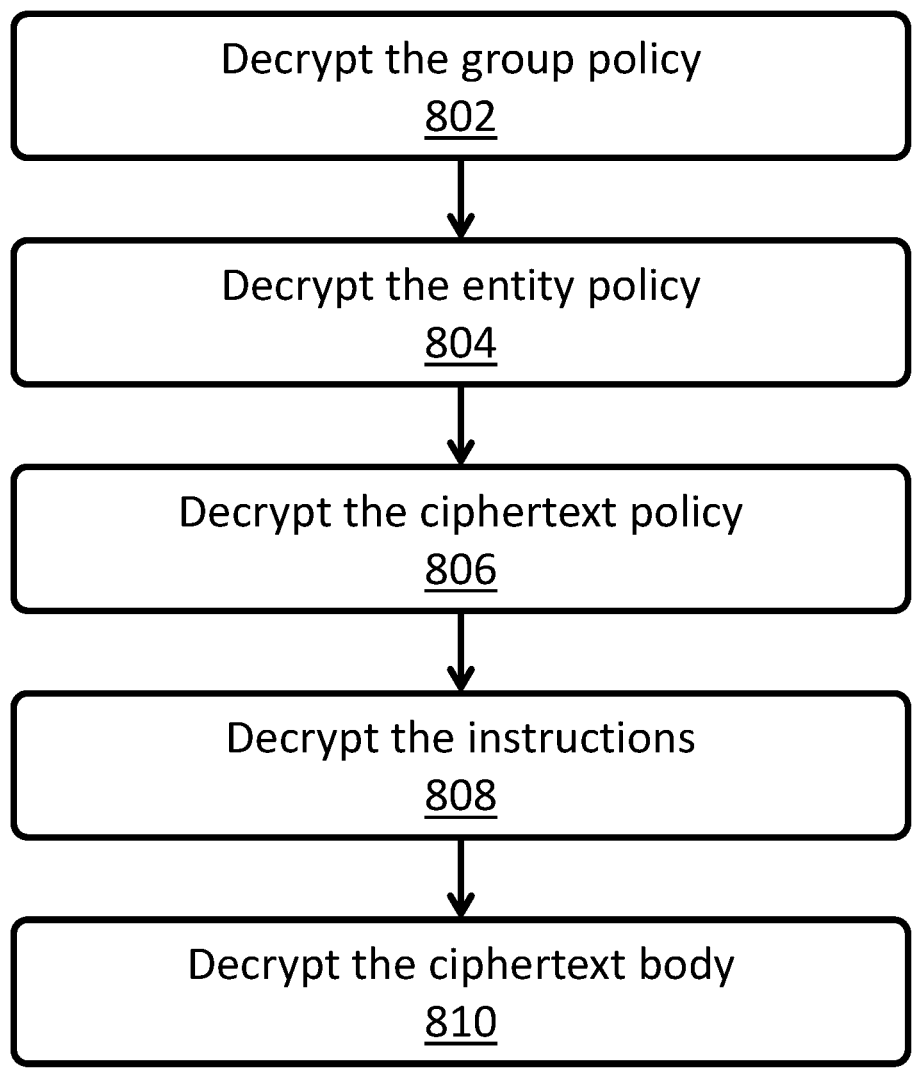
FIG. 8 is a flowchart diagram illustrating one embodiment of a decryption method for use in a system for data encryption or decryption.

FIG. 8 depicts one embodiment of a method 800. The method 800 may include a decryption method whereby the decryption module 110 may decrypt a ciphertext 400. The method 800 may include decrypting the group policy 502 (step 802). The method 800 may include decrypting the entity policy 504 (step 804). The method 800 may include decrypting the ciphertext policy 506 (step 806). The method 800 may include decrypting the instructions 404 (step 808). The method 800 may include decrypting the body 406 (step 810).

In one embodiment, the decryption module 110 may retrieve the three binary values from the group policy 502 of the header 402 of the ciphertext 400. The decryption module 110 may execute a remainder generator discussed above in relation to step 208 of the method 200 to calculate a remainder for each of the three binary values. The decryption module 110 may convert the remainders to a decimal value that represents the length of the group policy 502 plaintext string. The decryption module 110 may confirm that the decimal value matches the length of the group policy 502. The decryption module 110 may confirm that the group policy 502 from the ciphertext 400 matches the group policy 502 stored on the receiving computing device 120. If they do not match or if the length is different than the decimal value, the decryption module 110 may halt the decryption method 800. If they do match, the decryption module 110 may proceed to step 804.

In one embodiment, decrypting the entity policy 504 (step 804) may include the decryption module 110 retrieving the binary fingerprints from the entity policy 504, identifying the recipient user's binary fingerprint, and decrypting the binary fingerprint to confirm that it matches the USUP of the decrypting user. Decrypting the entity policy 504 (step 804) may include the decryption module 110 executing a self-authentication method on the binary fingerprints, described further below. In response to the decrypted USUP matching the USUP of the decrypting user (and, in some embodiments, the self-authenticating method confirming the authenticity of the binary fingerprints), the decryption module 110 may continue to step 806. In response to USUPs not matching (or in response to the self-authenticating method failing), the decryption module 110 may halt the decryption method 800.

In one embodiment, the decryption module 110 self-authenticating may include the decryption module 110(1) regenerating the user's USUP in the same manner as step 202 of the method 200; (2) retrieving the user's USUP generated during the step 202 of the method 200, which may be stored in the first file of the first file directory set up during the method 200; and (3) retrieving a copy of the USUP from the user's binary fingerprint of the entity policy 504 of the ciphertext's 400 header 402. The decryption module 110 may determine whether all three USUPs match. In response to one of the USUPs not matching, the decryption module 110 may halt the decryption method 800. In some embodiments, the decryption module 110 may revoke the USUP stored in the first file of the first file directory.

In one embodiment, decrypting the ciphertext policy 506 (step 806) may include the decryption module 110 retrieving the three binary values appended to the ciphertext body 406, which may represent the first unique identifier. The decryption module 110 may use the three binary values as inputs to three separate executions of a remainder generator discussed above in relation to step 208 of the method 200 to calculate a remainder for each binary value. The decryption module 110 may convert the three remainders to a decimal value, which may represent the length of the first unique identifier. The decryption module 110 may compare the received ciphertext policy 506 plaintext string and may compare it to the plaintext string stored on the recipient computing device 102. The decryption module 110 may confirm that the decimal value matches the length of the ciphertext policy 506. In response to the ciphertext policies 506 not matching or the length not matching the decimal value, the decryption module 110 may halt the method 800.

Otherwise, the decryption module 110 may continue by retrieving the three binary values appended to the ciphertext body 406 that represent the second unique identifier. The decryption module 110 may use the three binary values as input to three different executions of a remainder generator discussed above in relation to step 208 of the method 200 to calculate a remainder for each binary value and convert them to a decimal value. The decryption module 110 may calculate the number of total blocks in the ciphertext 400 and compares the result to the decimal value. If the decimal values are equal, the decryption module 110 may proceed to step 808. Otherwise, the decryption module 110 may halt the method 800.

In one embodiment, decrypting the instructions 404 (step 808) may include the decryption module 110 retrieving each decryption value set in the instructions 404. The decryption module 110 may process the decryption value sets sequentially. In response to the decryption module 110 failing to process a decryption value set, the decryption module 110 may halt the method 800. Otherwise, the decryption module 110 may continue and may decrypt the ciphertext 400 body 406 (step 810).

Ciphertext Body Encryption

Figure 9:
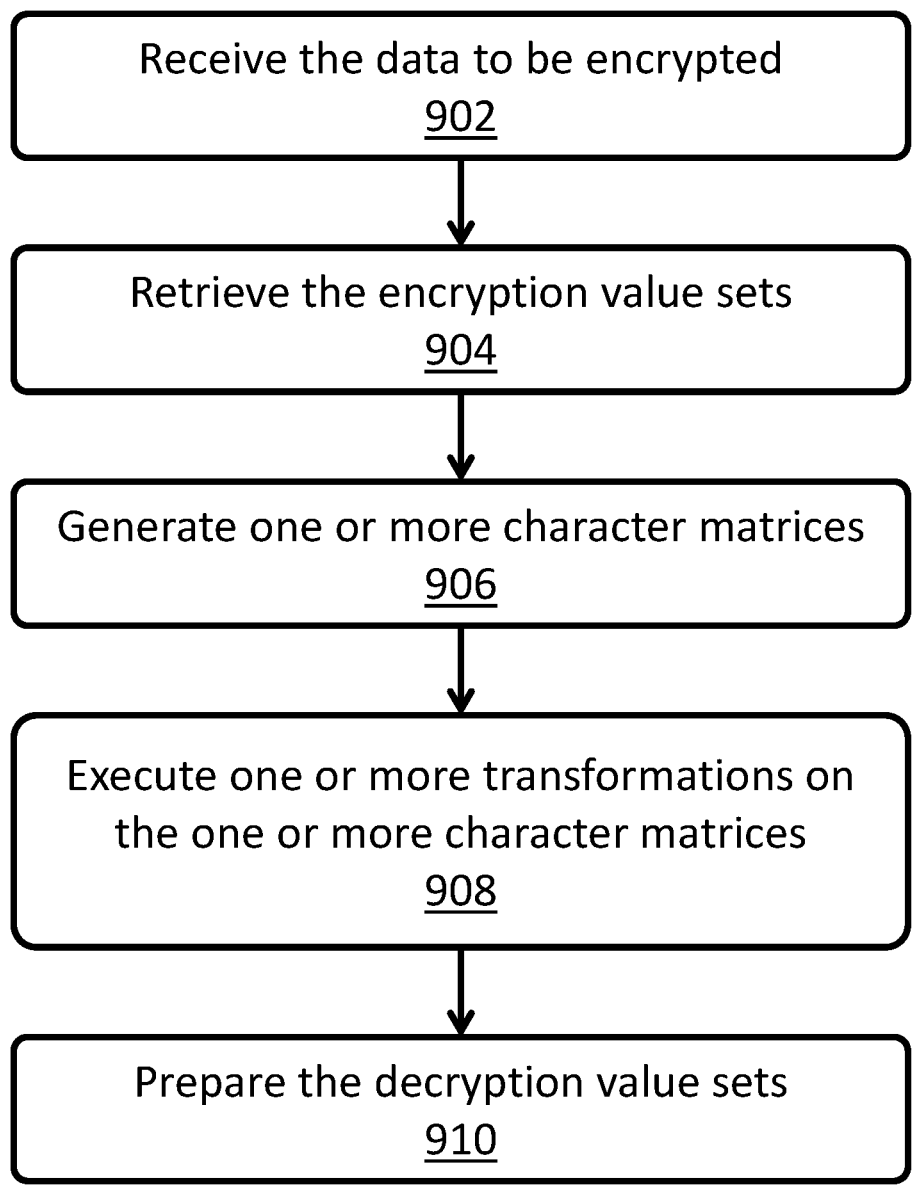
FIG. 9 is a flowchart diagram illustrating one embodiment of a method for encrypting data in order to generate the body of the ciphertext.

FIG. 9 depicts one embodiment of a method 900. The method 900 may include a method to encrypt the data in order to generate the body 406 of the ciphertext 400. The encryption module 108 may carry out one or more steps of the method 900. In some embodiments, the step of encrypting the data (step 710) of the method 700 may include one or more steps of the method 900.

The method 900 may include receiving the data to be encrypted (step 902). The method 900 may include retrieving the encryption value sets 620 (step 904). The method 900 may include generating one or more character matrices (step 906). The method 900 may include executing one or more transformations on the one or more character matrices (step 908). The method 900 may include preparing the decryption value sets (step 910).

In one embodiment, the method 900 may include receiving the data to be encrypted (step 902). The data to be encrypted may sometimes be known as the "plaintext." The data to be encrypted may include data received from a UI of a software application executing on the computing device 102. The software application may include the encryption module or may include some other software. The data to be encrypted may include a file, for example, a file stored in the data storage 112. The data to be encrypted may include text data, binary data, or data in some other format. In some embodiments, the data to be encrypted may include a single text string.

In one or more embodiments, the method 900 may include retrieving the encryption value sets 620 (step 904). The encryption value data sets may include at least one encryption value data set. The encryption value sets 620 may include the encryption value sets 620 generated by the witness module 106, as discussed above. Retrieving the encryption value sets 620 (step 904) may include retrieving the encryption value sets 620 from one or more files stored in the data storage 112 or from some other data storage. In some embodiments, the witness module 106 may read the encryption value sets 620 from the data storage 112 and provide the encryption value sets 620 to the encryption module 108.

In one embodiment, the method 900 may include generating one or more character matrices (step 906). The one or more character matrices may include two matrices: a first character matrix and a second character matrix. The first character matrix may be size m, where m is the value m 606 from the "Character Matrix P+1" encryption value set 620(1). The second character matrix may be size n, where n is the value n 608 from the "Character Matrix P+1" encryption value set 620(1). The characters of the data to be encrypted may be loaded into the first and second matrices, row by row and adding padding if not all of the matrix cells are filled by the characters. In some embodiments, the encryption module 108 may add padding to the data to be encrypted.

In one or more embodiments, the method 900 may include executing one or more transformations on the one or more character matrices (step 908). In some embodiments, the one or more transformations may include a first transformation, a second transformation, and a third transformation. The encryption module 108 may take the output of a transformation and may use it as input to a subsequent transformation.

In one embodiment, the first transformation may include a first cycle. The first cycle may include the encryption module 108 taking the first and second character matrices and running a character mixing scheme 602 on each character matrix. The character mixing 602 scheme may include the mixing scheme 602 from the "Character Matrix P+1" encryption value set 620(1). The first cycle may then include the encryption module 108 inputting the mixed first and second character matrices into the Transformation Engine P+1 and running the Transformation Engine P+1 the number of times equal to the encryption decider 610 from that encryption value set 620(1).

In one embodiment, the first transformation may include a second cycle. The second cycle may include the encryption module 108 taking the first and second character matrices (after they have been through the first cycle) and running a second character mixing scheme 602 on the first and second character matrices. The second character mixing scheme 602 may include the mixing scheme 602 from the "Character Matrix P−1" encryption value set 620(2). The second cycle may include the encryption module 108 inputting the encryption decider 610 from that encryption value set 620(2) into the Transformation Engine P−1 and using the Transformation Engine P−1 on the mixed first and second character matrices.

In one embodiment, the first transformation may include a third cycle. The third cycle may include the encryption module 108 running the Transformation Engine P−153 on the first and second character matrices (after they have been through the second cycle). The first transformation may then include splitting each character in each of the first and second character matrices into two nibbles in order to generate a first nibble matrix and a second nibble matrix.

In one embodiment, the encryption module 108 may use the first and second nibble matrices as input to the second transformation. The second transformation may include a first cycle. The first cycle may include the encryption module 108 running a nibble mixing scheme 602 on each nibble matrix. The nibble mixing scheme 602 may include the mixing scheme 602 from the "Nibble Matrix P+1" encryption value set 620(3). The first cycle may include the encryption module 108 inputting the encryption decider 610 from that encryption value set 620(3) into the Transformation Engine P+1 and using the Transformation Engine P+1 on the mixed first and second nibble matrices.

In one embodiment, the second transformation may include a second cycle. The second cycle may include the encryption module 108 taking the first and second nibble matrices (after they have been through the first cycle) and running a nibble mixing 602 scheme on the first and second nibble matrices. The nibble mixing scheme 602 may include the mixing scheme 602 from the "Nibble Matrix P−1" encryption value set 620(4). The second cycle may include the encryption module 108 inputting the encryption decider 610 from that encryption value set 620(4) into the Transformation Engine P−1 and using the Transformation Engine P−1 on the mixed first and second nibble matrices.

In one embodiment, the second transformation may include a third cycle. The third cycle may include the encryption module 108 running the Transformation Engine P−153 on the first and second nibble matrices (after they have been through the second cycle). The second transformation may include splitting each nibble in each of the first and second character matrices into four bits in order to generate a first bit matrix and a second bit matrix.

In one embodiment, the encryption module 108 may use the first and second bit matrices as input to the third transformation. The third transformation may include a first cycle. The first cycle may include the encryption module 108 retrieving the bit value 604 from the "Bit Matrix P+1" encryption value set 620(5) and retrieving the corresponding bit value table from the encryption module 108. The encryption module 108 may use the bit value table to convert each cell in the first and second bit matrices into a different four-bit number according to the bit value table. The first cycle may include the encryption module 108 running a bit matrix mixing scheme 602 on each bit matrix. The bit mixing scheme 602 may include the mixing scheme value from the "Bit Matrix P+1" encryption value set 620(5). The first cycle may include the encryption module 108 inputting the encryption decider 610 from that encryption value set 602(5) into the Transformation Engine P+1 and using the Transformation Engine P+1 on the mixed first and second bit matrices.

In one embodiment, the third transformation may include a second cycle. The second cycle may include the encryption module 108 retrieving the bit value 604 from the "Bit Matrix P−1" encryption value set 620(6) and retrieving the corresponding bit value table from the encryption module 108. The encryption module 108 may use the bit value table to convert each cell in the first and second bit matrices into a different four-bit number according to the bit value table. The second cycle may include the encryption module 108 taking the first and second bit matrices (after they have been through the first cycle) and running a bit mixing scheme 602 on the first and second bit matrices. The bit mixing scheme 602 may include the mixing scheme value from the "Bit Matrix P−1" encryption value set 620(6). The second cycle may include the encryption module 108 inputting the encryption decider 610 from that encryption value set 620(6) into the Transformation Engine P−1 and using the Transformation Engine P−1 on the mixed first and second bit matrices.

In one embodiment, the third transformation may include a third cycle. The third cycle may include the encryption module 108 running the Transformation Engine P−153 on the first and second bit matrices (after they have been through the second cycle). At this point, the encryption of the plaintext may be complete. The encryption module 108 may include the encrypted plaintext as part of the body 406 of the ciphertext 400.

In some embodiments, the method 900 may include preparing the decryption value sets (step 910). The decryption value sets may include at least one decryption value set. Preparing the decryption value sets (step 910) may include the encryption module 108 copying the encryption value sets 620 and designating these copies as the decryption value sets. The encryption module 108 may then delete the encryption decider 610 from the decryption value sets so that each decryption value set includes a mixing scheme 602, bit value 604, m 606, n 608, and decryption decider 612. In one embodiment, preparing the decryption value sets (step 910) may include the encryption module 108 using a remainder generator (discussed above in relation to step 208 of the method 200) to calculate three remainders for each m 606, n 608, and decryption decider 612 in each decryption value set. The decryption value sets may now be complete. The encryption module 108 may then include the decryption value sets as part of the ciphertext instructions 404 of the ciphertext 400.

Figure 10A:
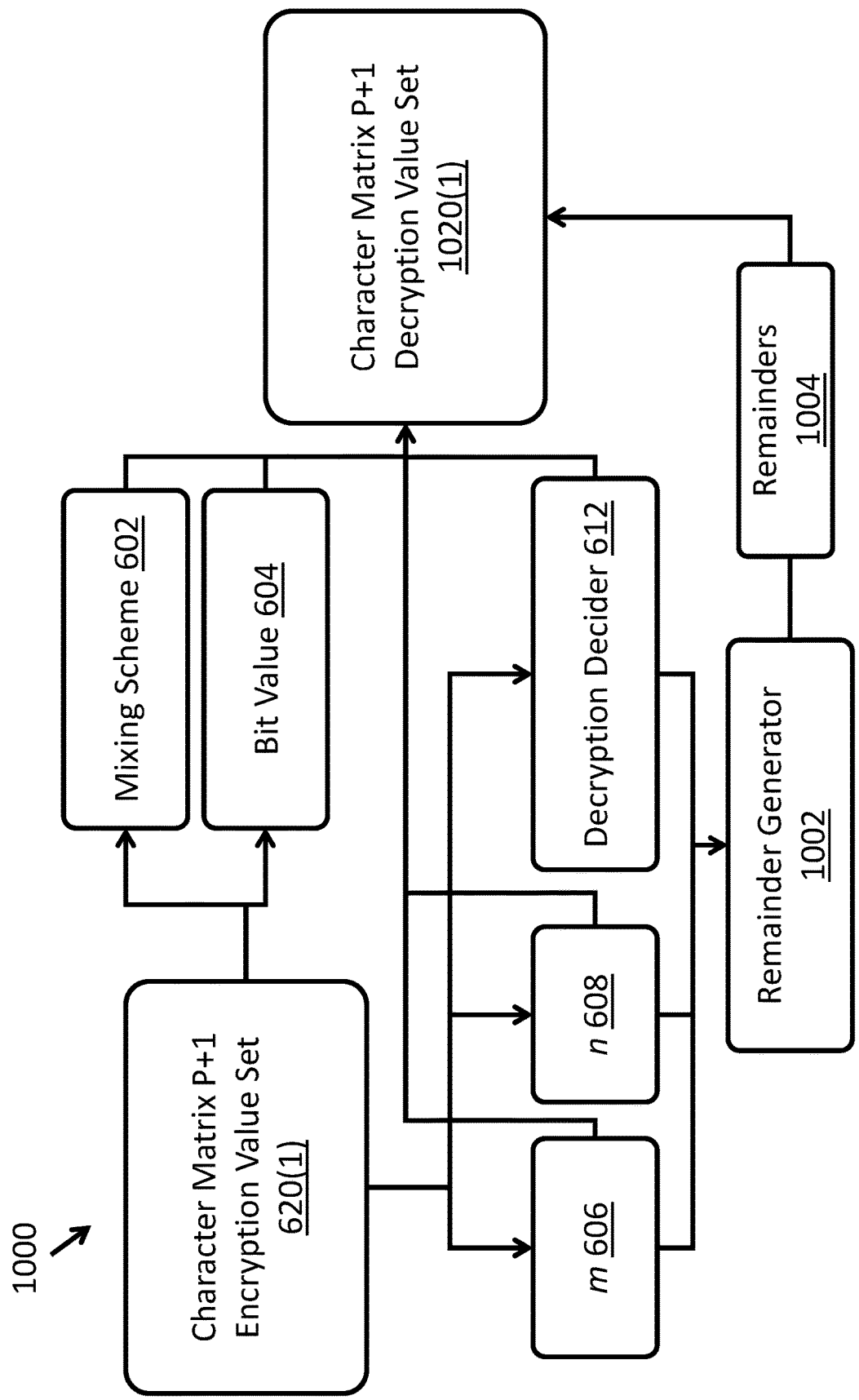
FIG. 10A is a data flow diagram illustrating one embodiment of the construction of a decryption value set for use in a system for data encryption or decryption.
Figure 10B:
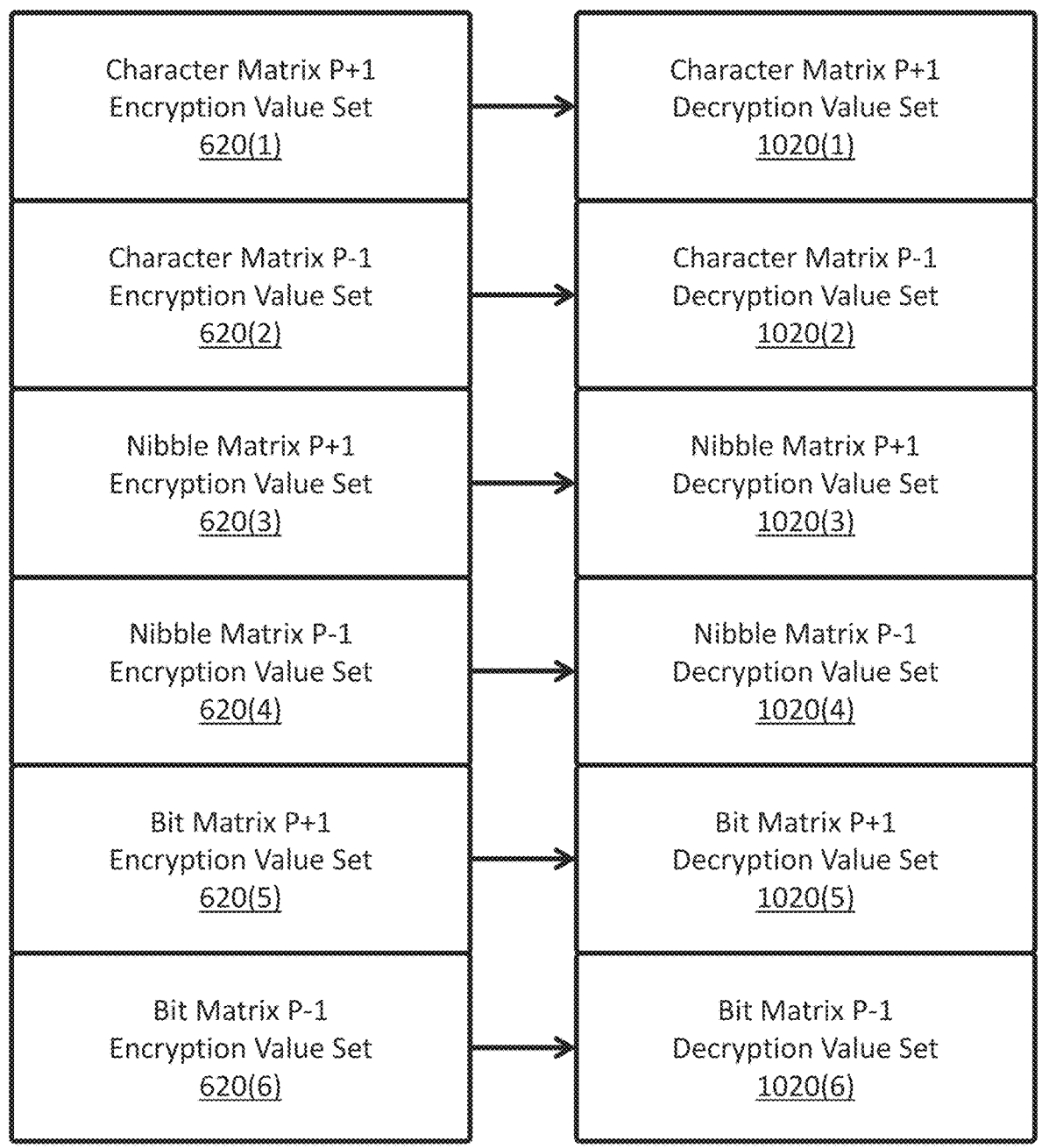

FIG. 10A depicts one embodiment of a dataflow 1000. The data flow 1000 may show how the values mixing scheme 602, bit value 604, first matrix size 606, second matrix size 608, and decryption decider 612 of an encryption value set 620 (in the example of FIG. 10A, the "Character Matrix P+1" encryption value set 620(1)) is included in the decryption value set 1020 (in the example of FIG. 10A, the "Character Matrix P+1" decryption value set). The values mixing scheme 602 and bit value 604 are included in the decryption value set 1020. The values m 606, n 608, and decryption decider 612 are also included, but their remainders 1004 are also calculated by the remainder generator 1002 and included in the decryption value set 1020. FIG. 10B depicts a diagram indicating how each decryption data set 1020(1)-(6) is derived from its corresponding encryption data set 620(1)-(2) of FIG. 6B.

In one embodiment, the number of decryption value sets 1020 may match the number of encryption value sets 620. In other embodiments, the number encryption value sets 620 and decryption value sets 1020 may not match. In some embodiments, the set of decryption value sets 1020 may include fewer than six decryption value sets 1020 or more than six decryption value sets 1020. For example, there may be one decryption value set 1020, two decryption value sets 1020, three decryption value sets 1020, four decryption value sets 1020, five decryption value sets 1020, seven decryption value sets 1020, eight decryption value sets 1020, nine decryption value sets 1020, or ten decryption value sets 1020.

Ciphertext Body Decryption

FIG. 11 depicts one embodiment of a method 1100. The method 1100 may include a method to decrypt the body 406 of the ciphertext 400. The decryption module 110 may carry out one or more steps of the method 1100. In some embodiments, the step of decrypting the body 406 (step 810) of the method 800 may include one or more steps of the method 1100.

The method 1100 may include receiving the ciphertext 400 body 406 (step 1102). The method 1100 may include retrieving the decryption value sets 1020 (step 1104). The method 1100 may include executing one or more transformations on the body 406 (step 1106).

In one embodiment, receiving the ciphertext 400 body 406 (step 1102) may include receiving the binary string of the body 406 of the ciphertext 400 sent by the sending computing device 102. The body 406 may have been encrypted according to the method 900 of FIG. 9, discussed above. Receiving the ciphertext 400 body 406 (step 1102) may include formatting the body 406 into a first and second bit matrix where each cell of each matrix includes a four-bit number. For example, the first four bits of the body 406 will be placed into the first cell of the first matrix, the second four bits of the body 406 will be placed into the second cell of the first matrix, and so on until the entire body 406 has been placed into the first and second matrices.

In one embodiment, retrieving the decryption value sets 1020 (step 1104) may include retrieving the decryption value sets 1020 that the decryption module 110 decrypted as part of the step 808 of the method 800. The decryption module 110 may use the decryption value sets 1020 to decrypt the body 406.

In some embodiments, executing the one or more transformations on the body 406 (step 1106) may include executing a first transformation, a second transformation, and a third transformation on the body 406. The decryption module 110 may take the output of a transformation and may use it as input to a subsequent transformation.

In one embodiment, the first transformation may include a first cycle. The first cycle may include the decryption module 110 running the Transformation Engine P−153 on the first and second bit matrices of the body 406.

In one embodiment, the first transformation may include a second cycle. The second cycle may include the decryption module 110 retrieving the bit value 604 from the "Bit Matrix P−1" decryption value set 1020(6) and retrieving the corresponding bit value table from the decryption module 110. The decryption module 110 may use the bit value table to convert each cell in the first and second bit matrices (after they have been through the first cycle) into a different four-bit number according to the bit value table. The second cycle may include the decryption module 110 taking the first and second bit matrices (after they have been through the first cycle) and running a bit mixing scheme 602 on the first and second bit matrices. The bit mixing scheme 602 may include the bit mixing scheme 602 included in the "Bit Matrix P−1" decryption value set 1020(6). The second cycle may include the decryption module 110 inputting the decryption decider 612 from the decryption value set 1020(6) into the Transformation Engine P−1 and using the Transformation Engine P−1 on the mixed first and second bit matrices.

In one embodiment, the first transformation may include a third cycle. The third cycle may include the decryption module 110 retrieving the bit value 604 from the "Bit Matrix P+1" decryption value set 1020(5) and retrieving the corresponding bit value table from the decryption module 110. The decryption module 110 may use the bit value table to convert each cell in the first and second bit matrices (after they have been through the second cycle) into a different four-bit number according to the bit value table. The third cycle may include the decryption module 110 taking the first and second bit matrices and running a bit mixing scheme 602 on each bit matrix. The bit mixing scheme 602 may include the bit mixing scheme 602 of the "Bit Matrix P+1" decryption value set 1020(5). The third cycle may include the decryption module 110 inputting the decryption decider 612 from the decryption value set 1020(5) into the Transformation Engine P+1 and using the Transformation Engine P+1 on the mixed first and second bit matrices. The first transformation may include joining the bits in the bit matrices in to create first and second nibble matrices.

In one embodiment, the decryption module 110 may use the first and second nibble matrices as input to the second transformation. In one embodiment, the second transformation may include a first cycle. The first cycle may include the decryption module 110 running the Transformation Engine P−153 on the first and second nibble matrices.

In one embodiment, the second transformation may include a second cycle. The second cycle may include the decryption module 110 taking the first and second nibble matrices (after they have been through the first cycle) and running a nibble mixing scheme 602 on the first and second nibble matrices. The nibble mixing scheme 602 may include the nibble mixing scheme 602 included in the "Nibble Matrix P−1" decryption value set 1020(4). The second cycle may include the decryption module 110 inputting the decryption decider 612 from the decryption value set 1020(4) into the Transformation Engine P−1 and using the Transformation Engine P−1 on the mixed first and second nibble matrices.

In one embodiment, the second transformation may include a third cycle. The third cycle may include the decryption module 110 running a nibble mixing scheme 602 on each nibble matrix (after they have been through the second cycle). The nibble mixing scheme 602 may include the nibble mixing scheme 602 included in the "Nibble Matrix P+1" decryption value set 1020(3). The third cycle may include the decryption module 110 inputting the decryption decider 612 from the decryption value set 1020(3) into the Transformation Engine P+1 and using the Transformation Engine P+1 on the first and second nibble matrices. The second transformation may include joining each nibble in each of the first and second nibble matrices in order to generate a first character matrix and a second character matrix.

In one embodiment, the decryption module 110 may use the first and second character matrices as input to the third transformation. In one embodiment, the third transformation may include a first cycle. The first cycle may include the decryption module 110 running the Transformation Engine P−153 on the first and second character matrices₁

In one embodiment, the third transformation may include a second cycle. The second cycle may include the decryption module 110 taking the first and second character matrices (after they have been through the first cycle) and running a character mixing scheme 602 on the first and second character matrices. The character mixing scheme 602 may include the character mixing scheme 602 included in the "Character Matrix P−1" decryption value set 1020(2). The second cycle may include the decryption module 110 inputting the decryption decider 612 from the decryption value set 1020(2) into the Transformation Engine P−1 and using the Transformation Engine P−1 on the mixed first and second character matrices.

The third transformation may include a third cycle. The third cycle may include the encryption module 108 taking the first and second character matrices (after they have been through the second cycle) and running a character mixing scheme 602 on each character matrix. The character mixing scheme 602 may include the character mixing scheme 602 included in the "Character Matrix P+1" decryption value set 1020(1). The third cycle may include the decryption module 110 inputting the decryption decider 612 from the decryption value set 1020(1) into the Transformation Engine P+1 and using the Transformation Engine P+1 on the mixed first and second character matrices. At this point, the first and second character matrices may form the decrypted plaintext. The method 1100 may include removing any padding in the plaintext. At this point, the decryption of the body 406 may be complete.

Proof of Work

In one embodiment, the systems and methods disclosed herein may provide a proof-of-work protocol. The proof-of-work protocol include one or more procedures, called gateway proofs, that the sender of a ciphertext 400 and the receiver of the ciphertext 400 each complete. A gateway proof may demonstrate that the sender or receiver expended a certain amount of computational effort to complete the gateway proof. The sender or receiver of the ciphertext 400 may complete a gateway proof in non-deterministic polynomial time.

Figure 12:
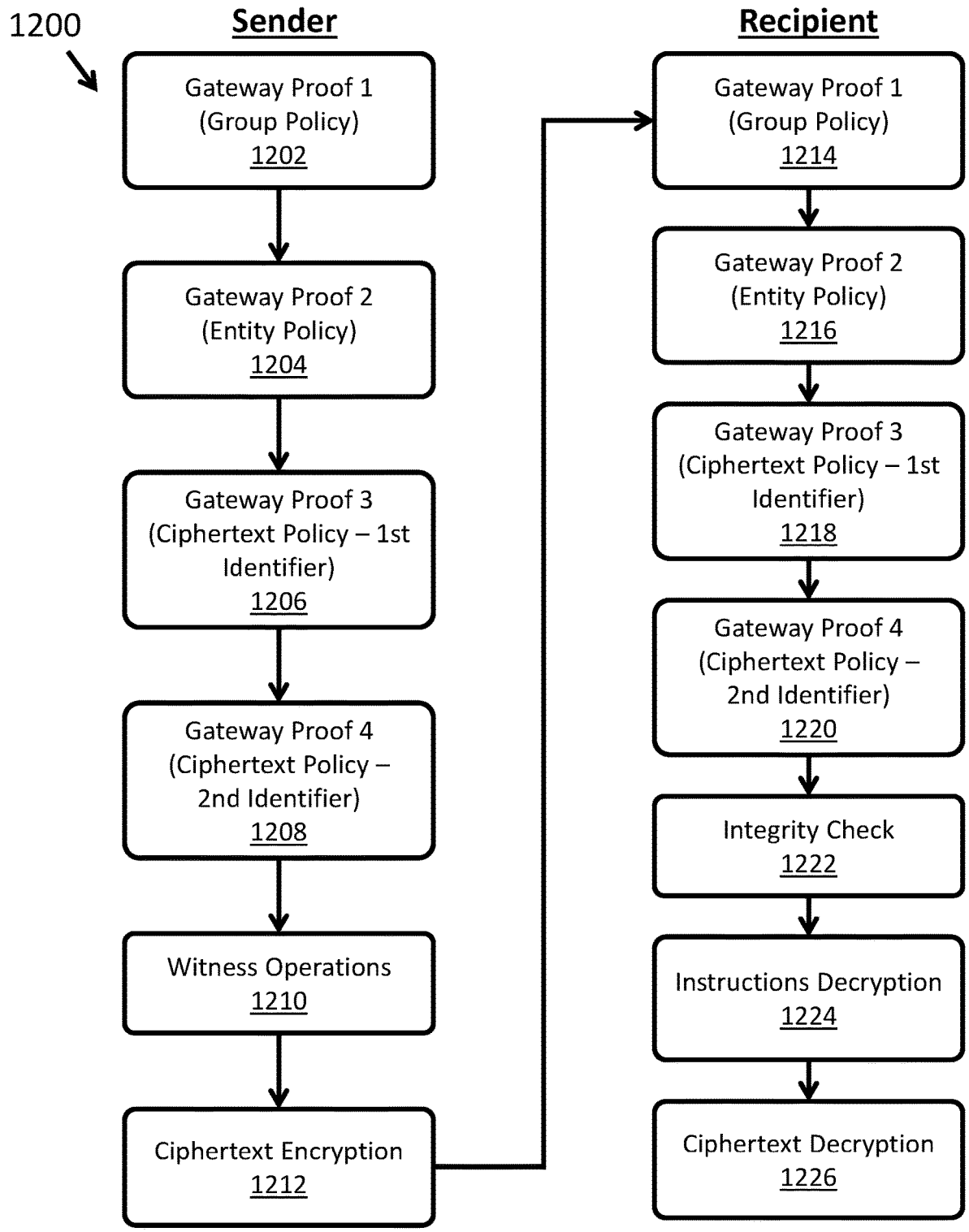
FIG. 12 is a data flow diagram illustrating one embodiment showing the operation of one embodiment of a proof-of-work for use in a system for data encryption or decryption.

FIG. 12 depicts one embodiment of a data flow 1200 showing the operation of one embodiment of a proof-of-work. In one embodiment, each gateway proof or other operation must be completed (by the respective sender or recipient) in order to move on to the next gateway proof or operation. In some embodiments, the operations 1202-1212 performed by the sender may be performed by the encryption module 108 of the sender's computing device 102. The operations 1214-1226 performed by the recipient may be performed by the decryption module 110 of the recipient's computing device 120.

In one embodiment, the first gateway proof 1202 may include the sender generating the group policy 502. This may include one or more operations discussed above in relation to step 702 of the method 700 of FIG. 7. The second gateway proof 1204 may include the sender generating the entity policy 504. This may include one or more operations discussed above in relation to step 704 of the method 700. The third gateway proof 1206 may include the sender generating the first unique identifier of the ciphertext policy 506, which may include the string of text established by the user, group, or organization using the computing device 102 as discussed above in relation to FIG. 5. The fourth gateway proof 1208 may include the sender generating the second unique identifier of the ciphertext policy 506, which may include the three binary values that will be appended to the ciphertext body 406. The third and fourth gateway proofs 1206, 1208 may include one or more operations discussed above in relation to step 706 of the method 700.

In one embodiment, after completion of the four gateways 1202-1208 by the sender, the witness module 106 may, as part of the operation 1210, generate the encryption value sets 620 used in the encryption of the ciphertext 400, as discussed above. The encryption module 108, as part of operation 1212, may use the encryption value sets 620 generated in operations 1210 to encrypt the data to be encrypted to generate the body 406, as discussed above in relation to the method 900 of FIG. 9. The encryption module 108 may use the results of the gateway proofs 1202-1208, the witness operations 1210, and the ciphertext encryption 1212 to create the ciphertext 400, as discussed above in relation to steps 708-712 of the method 700. The sender may then send the ciphertext 400 to the recipient.

The recipient may receive the ciphertext 400. In one embodiment, the first gateway proof 1214 may include the recipient determining whether the group policy 502 of the header 402 of the received ciphertext 400 matches the group policy 502 the recipient has stored (e.g., in the data storage 112 of the recipient's computing device 120). The second gateway proof 1216 may include the recipient determining whether the USUP in the entity policy 504 of the header 402 of the received ciphertext 400 matches the USUP associated with the sender that the recipient has stored. The third gateway proof 1218 may include the recipient determining whether the first unique identifier of the ciphertext policy 506 of the received ciphertext 400 matches the first unique identifier established during the setup process. The fourth gateway proof 1220 may include the recipient determining whether the second unique identifier of the ciphertext policy 506 of the received ciphertext 400 matches the ciphertext's 400 length.

In one embodiment, the recipient may perform an integrity check 1222. The integrity check 1222 may include the decryption module 120 recreating the file directories and file configurations the setup module 104 generated during the setup process of the method 200 of FIG. 2. The recreated file directories and file configurations may include copies of the file directories and configurations set up by the setup module 104 of the sender or of the receiver.

In some embodiments, the recipient may decrypt the instructions 404 of the ciphertext 400 (1224). Decrypting the instructions 404 (1224) may include one or more operations of the decrypting the instructions 404 step 808 of the method 800 of FIG. 8. In some embodiments, the recipient may decrypt the ciphertext body 406 (1226). Decrypting the body 406 (1226) may include one or more of the steps of the method 900 of FIG. 9.

Binary Fingerprint Storage

Figure 13:
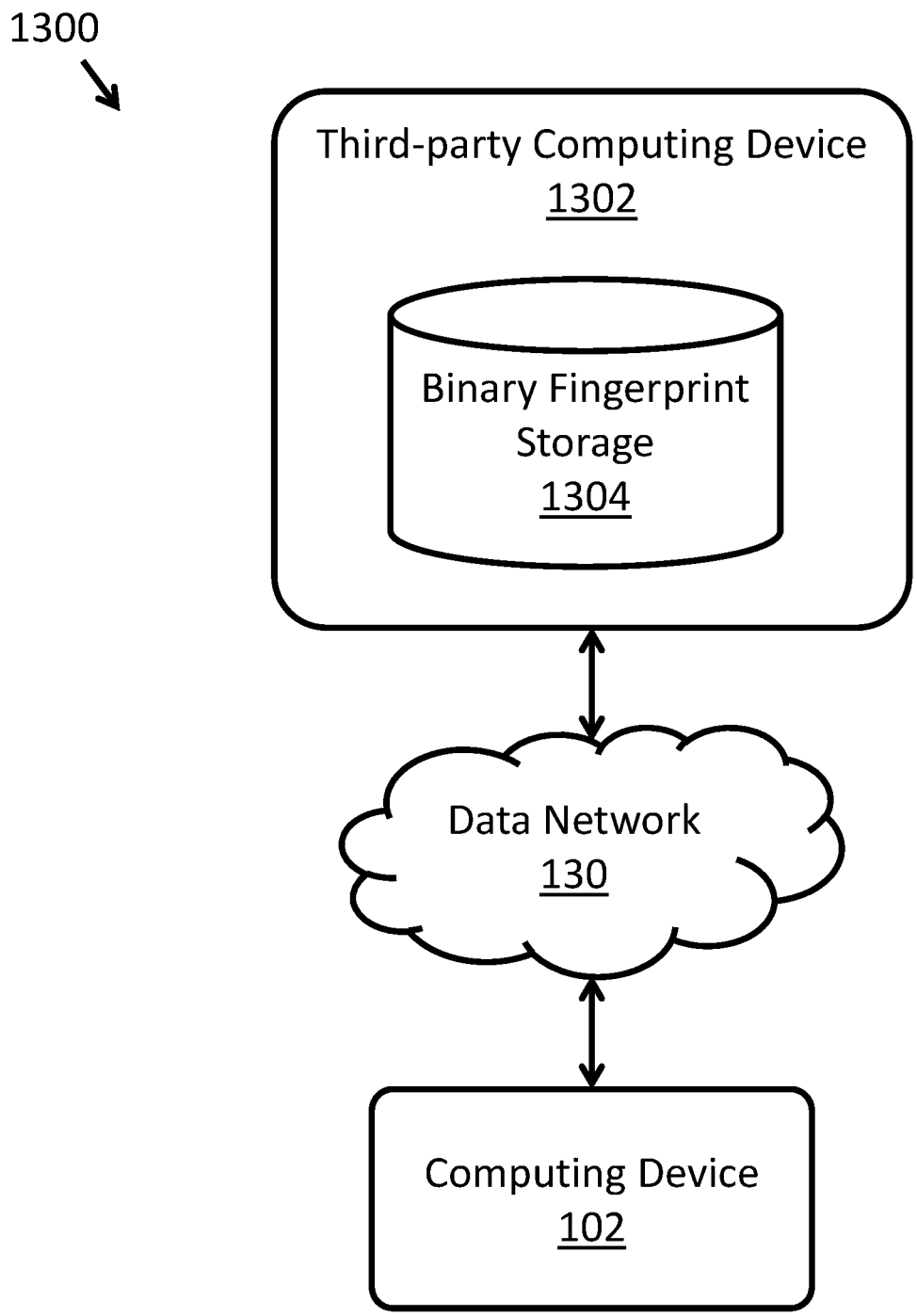
FIG. 13 is a schematic block diagram illustrating one embodiment of a system using a third-party computing device to store binary fingerprints for use in a system for data encryption or decryption.

FIG. 13 depicts one embodiment of a system 1300. The system 1300 may include the computing device 102 of FIG. 1. The system 1300 may include a third-party computing device 1302. The third-party computing device 1302 may include a binary fingerprint storage 1304. The binary fingerprint storage 1304 may store one or more binary fingerprints. The computing device 102 and the third-party computing device 1302 may be in data communication with each other over the data network 130 of FIG. 1. In one embodiment, the third-party computing device 1302 may include at least two functions: storing copies of binary fingerprints and sending a copy of a binary fingerprint to a computing device 102 in response to a request. In some embodiments, the third-party computing device 1302 may not generate binary fingerprints, only store them and send copies of them.

In one embodiment, during or after the setup process of the method 200 of FIG. 2, the setup module 104 of the computing device 102 may send the binary fingerprint of a user to the third-party computing device 1302 for storage of the binary fingerprint. The setup module 104 may send an identifier to be associated with the binary fingerprint. The identifier may include an employee ID number of the user whose binary fingerprint it is. The identifier may include an email address, a username, or some other identifying information.

In one embodiment, as part of an operation of the computing device 102, such as the execution of a self-authentication operation, discussed above, the computing device 102 may request a binary fingerprint. The request may include an identifier associated with the requested binary fingerprint. The third-party computing device 1302 may send the requested binary fingerprint in response to the request. The binary fingerprint may include the binary fingerprint of the requesting user. The binary fingerprint may include a binary fingerprint of another user of another computing device 120.

In one embodiment, the binary fingerprint storage 1304 may include one or more files stored in a file system of the third-party computing device. The binary fingerprint storage 1304 may include a database. The binary fingerprint storage 1304 may include a distributed ledger, such as a blockchain. A binary fingerprint may be stored in a distributed ledger transaction of the distributed ledger. In an embodiment where the binary fingerprint storage 1304 includes a distributed ledger, the third-party computing device 1302 may include a distributed ledger or blockchain node. In other embodiments, the third-party computing device 1302 may be in data communication with a distributed ledger/blockchain node.

Software/Hardware

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of a new and useful SYSTEMS AND METHODS FOR DATA ENCRYPTION, DECRYPTION, AND AUTHENTICATION it is not intended that such references be construed as limitations upon the scope of this disclosure.

What is claimed is:

1. A computer-implemented method for generating a trusted setup on a computing device, the method including:
    generating a unique single user profile (USUP) based on data derived from the computing device;
    generating a first binary matrix;
    executing a matrix mixing operation on the first binary matrix based on the USUP, wherein executing the matrix mixing operation generates a second binary matrix;
    generating trust anchor data associated with the second binary matrix, wherein generating the trust anchor data includes:
    selecting a first number, wherein the first number is based on a characteristic of the USUP,
    inputting the first number into a remainder generator, wherein the remainder generator is configured to:
    select a second number,
    calculate a remainder, wherein the remainder is a remainder of the first number divided by the second number, and
    output a value pair that includes the second number and the remainder, converting the remainder to a first binary value, and storing the first binary value;
    accessing the trust anchor data;
    generating, based on the trust anchor data, one or more trust anchors; and
    encrypting or decrypting data at a later time based on the one or more trust anchors.

2. The computer-implemented method of claim 1, wherein the data derived from the computing device includes at least one of:
    a username of a user of the computing device;
    a device name of the computing device;
    a file location in a file directory of the computing device; or
    a device identifier of the computing device.

3. The computer-implemented method of claim 1, wherein the first binary matrix comprise cells, wherein each cell of the first binary matrix includes a binary string.

4. The computer-implemented method of claim 1, wherein the first binary matrix includes a 16 by 16 matrix.

5. The computer-implemented method of claim 1, wherein:
    executing the matrix mixing operation on the first binary matrix includes:
    calculating a length of the USUP,
    converting the length of the USUP to a second binary value, iterating across digits of the second binary value, in response to a current digit of the second binary value being 1, executing a Transformation Engine P+1 operation on the first binary matrix, and in response to the current digit of the second binary value being 0, executing a Transformation Engine P−1 operation on the first binary matrix.

6. The computer-implemented method of claim 1, wherein the first number includes at least one of: a length of the USUP; or a number selected via a pseudorandom number generator.

7. The computer-implemented method of claim 5, wherein the length of the USUP comprises a number of text characters in the USUP.

8. The computer-implemented method of claim 5, wherein executing the Transformation Engine P+1 operation on the first binary matrix comprises: until a condition is satisfied: executing a plurality of permutations on the first binary matrix, the plurality of permutations comprising shuffling cells of the first binary matrix, executing a plurality of cycles on one or more subsets of the first binary matrix, wherein cells of each subset of the one or more subsets of the first binary matrix are iteratively shuffled, and determining whether the condition is satisfied based on an initial state of the first binary matrix, a number of discrete cells in the first binary matrix, and a number of times the plurality of permutations on the first binary matrix and the plurality of cycles on the one or more subsets of the first binary matrix are executed, and outputting the number of times the plurality of permutations on the first binary matrix and the plurality of cycles on the one or more subsets of the first binary matrix are executed.

9. The computer-implemented method of claim 5, wherein executing the Transformation Engine P−1 operation on the first binary matrix comprises: until a condition is satisfied: executing a plurality of permutations on the first binary matrix, the plurality of permutations comprising shuffling cells of the first binary matrix, executing a plurality of cycles on one or more subsets of the first binary matrix, wherein cells of each subset of the one or more subsets of the first binary matrix are iteratively shuffled, and determining whether the condition is satisfied based on an initial state of the first binary matrix, a number of discrete cells in the first binary matrix, and a number of times the plurality of permutations on the first binary matrix and the plurality of cycles on the one or more subsets of the first binary matrix are executed, and outputting the number of times the plurality of permutations on the first binary matrix and the plurality of cycles on the one or more subsets of the first binary matrix are executed.

* * * * *